(12) United States Patent
Aoki

(10) Patent No.: US 6,530,020 B1
(45) Date of Patent: Mar. 4, 2003

(54) GROUP ORIENTED PUBLIC KEY ENCRYPTION AND KEY MANAGEMENT SYSTEM

(75) Inventor: Ryuichi Aoki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/099,308

(22) Filed: Jun. 18, 1998

(30) Foreign Application Priority Data

Jun. 20, 1997 (JP) .............................................. 9-164506

(51) Int. Cl.⁷ ............................................... H04L 9/00
(52) U.S. Cl. ........................ 713/163; 380/278; 380/279; 380/282; 380/284
(58) Field of Search .......................... 713/163; 380/278, 380/279, 282, 284

(56) References Cited

U.S. PATENT DOCUMENTS

| | | | |
|---|---|---|---|
| 4,200,770 A | | 4/1980 | Hellman et al. |
| 5,748,736 A | * | 5/1998 | Mittra .......................... 713/163 |
| 5,953,419 A | * | 9/1999 | Lohstroh et al. ............. 713/165 |

FOREIGN PATENT DOCUMENTS

JP            7-297818          4/1994

\* cited by examiner

*Primary Examiner*—Gail Hayes
*Assistant Examiner*—James Seal

(57) ABSTRACT

In a public key encryption system where an individual is used as a unit, an idea of "group" is newly introduced. Then, both an encryption process operation of a plain text by an arbitrary member belonging to the group, and a decryption process operation of cryptogram information can be executed by employing such a combination key made from a group public key and a group secret key, which are produced in unit of "group", and further an individual public key and an individual secret key. With employment of this encryption system, while high secrecies can be maintained inside and outside the group, the cryptogram information can be commonly shared based upon a confirmation of a member among members within the group. Also, an electronic signature can be made by a member belonging to the group.

23 Claims, 16 Drawing Sheets a: TRUST LEVEL OF INDIVIDUAL A
b: TRUST LEVEL OF INDIVIDUAL B

FIG. 1 c: TRUST LEVEL FOR CREDIT SUBJECT
d: TRUST LEVEL OF THE CREDIT SUBJECT
   TO ANOTHER CREDIT SUBJECT

FIG. 2

| | | | | | | |
|---|---|---|---|---|---|---|
| $I_1$ | $I_2$ | $I_3$ | ... | $I_i$ | ... | $I_n$ |
| $L_{i1}$ | $L_{i2}$ | $L_{i3}$ | ... | $L_{ii}$ | ... | $L_{in}$ |
| $G_1$ | $G_2$ | $G_3$ | ... | $G_i$ | ... | $G_n$ |
| $L_{G1}$ | $L_{G2}$ | $L_{G3}$ | ... | $L_{Gi}$ | ... | $L_{Gn}$ |

G: TRUSTED GROUP LOCK
LG: LABEL OF GROUP LOCK $G_i$
$I_i$: TRUSTED PUBLIC KEY OF INDIVIDUAL
$L_i$: LABEL CORRESPONDING TO INDIVIDUAL PUBLIC KEY $I_i$

*FIG. 5*

| $G_i$ | $L_{G_i}$ |
|---|---|
| $G_1$ | $L_{G_1}$ |
| $G_2$ | $L_{G_2}$ |
| $G_3$ | $L_{G_3}$ |
| ... | ... |
| $G_i$ | $L_{G_i}$ |
| ... | ... |
| $G_n$ | $L_{G_n}$ |

$G_i$: GROUP LOCK WHERE SELECT KEY IS USABLE
$L_G$: LABEL OF GROUP LOCK $G_i$

FIG. 6

GROUP ORIENTED PUBLIC KEY ENCRYPTION AND KEY MANAGEMENT SYSTEM

BACKGROUND OF THE INVENTION

1. Field of the Invention

The present invention generally relates to a public key encryption system arranged by a combination between a first key P and a second key S, the first key P being used in a data conversion for encrypting a plain text, and the second key S being different from the first key P and being used in a data conversion for decrypting a cryptogram to produce a plain text. More specifically, the present invention is directed to such a public key encryption system in which an idea of "group" is introduced, and both an encryption process of a plain text by an arbitrary member belonging to this group, and a decryption process of a cryptogram can be executed by employing such a combination key made from a group public key and a group secret key, which are produced in unit of "group", and further an individual public key and an individual secret key. With employment of this encryption system, while high secrecies can be maintained inside and outside the group, cryptogram information can be commonly shared based upon a confirmation of a member among members within this group. Also, since an electronic signature can be made by a member belonging to this group.

2. Description of the Related Art

An encryption system called a "public key encryptions" is described in U.S. Pat. No. 4,200,770. A public key encryption contains a public key used to encrypt a plain text, and also a secret key used to decrypt a cryptogram to obtain a plain text. The public key is different from the secret key. The public key is such a key opened to the public and set under known state. In a conventional encryption system, the same key is used in both the encryption process and the decryption process. Therefore, it is very important to keep secrecies of keys during encryption process. However, in this public key encryption system, secrecies of keys during encryption process are no longer required. In the conventional encryption/decryption common key system, assuming now that a total number of persons who communicate an encrypted document is selected to be "n", $n \times (n-1)/2$ pieces of keys are required, whereas in the public key encryption system, there is a merit that only "n" pieces of keys are required. Also, this public key encryption system is featured by that the same frame combination can be utilized also in the encryption process by the signatures of the respective persons, namely by using the secret keys of the respective persons. For instance, an encryption communication member P having a secret key A converts a communication sentence X by using the secret key A, and then sends both the resultant document Y and the communication sentence X to another member Q. The member Q converts the document Y by a public key B of the member P. If the conversion result of the document Y is made coincident with the document X, then it can be confirmed that this document has been surely sent by the member P. As previously described, the public key encryption system may have several superiors merits, as compared with the conventional encryption system.

Also, Japanese Patent Unexamined Publication No. Hei. 7-297818 discloses the arrangement for allocating the public key and the secret key to a group. This system owns the following initial condition. That is, a group secret key is embedded in a physical article such as a card, and members of the group surely hold the cards. In other words, since the above-described secret key/public key encryption system is arranged by utilizing the physical article such as a card, the key management is realized by utilizing the physical article separated from the permanental presence such as an individual.

In the public key encryption system, the permanent presence such as an individual is set as an independent unit. As a consequence, this public key encryption system cannot have sufficient functions in such a case that, for instance, a plurality of members other than an individual are set as a single unit. Also, in the above-described encryption system using the card, the following problems occur. That is, this encryption system must employ the hardware such as the card, and owns the problems of card management, the authorization problems of the card owners caused when the cards are lost and/or stolen. Namely, this encryption system can hardly judge as to whether or not one card holder is an authorized card holder.

For example, an organization such as a department, a section, or a group in a firm corresponds to a unit of a joint work. Also, an organization corresponds to a unit of a joint work constructed of plural individuals called "task force" independently established from the above organization. In these joint work units, information must also be commonly shared. In other words, as to a relationship established in inside/outside of the joint work unit, a secrecy of information must be maintained, whereas the information is required to be communicated among the respective members in the joint work unit. As a consequence, it is required to employ such an encryption system that an arbitrary structural member of the joint work unit is capable of performing either a decryption process or a sign process with respect to commonly-used information.

Furthermore, since a structural member of the joint work unit may be changed (e.g., an addition or a deletion), the encryption system is required to be capable of accepting a member change. Similarly to the joint work unit, in order to play a role such as a personnel department manager in a firm, a specific/continued secrecy condition responding to this role must be maintained, independently from a specific person who plays this role at a certain stage, and this encryption system must accept a change in the person who plays this role.

SUMMARY OF THE INVENTION

The present invention has been made to solve the above-described problems, and therefore, has an object to provide an encryption system capable of realizing the following aspects. That is, while the public key encryption system is realized not by employing a unit of an individual, such an encryption system is provided which can be used in a group equal to a set of individuals and groups as structural elements, and a member belonging to a specific group can decrypt a cryptogram.

Furthermore, another object of the present invention is to provide a signature system capable of signing by an arbitrary member belonging to a specific group, and also capable of confirming that a signed document is actually signed by the member belonging to the specific group.

The present invention provides a public key encryption system arranged by a combination between a first key P and a second key S, the first key P being used in a data conversion for encrypting a plain text, and the second key S being different from the first key P and being used in a data conversion for decrypting a cryptogram to produce a plain text, comprising: a group public key $P_G$ and a group secret key $S_G$, which are allocated in a unit of a group constituted by one or more members Mi (i=1 to n) as constructive members; and one or more encrypted group secret keys $P_{Mi}(S_G)$ (i =1 to n) encrypted by executing the data conversion of the group secret key $S_G$ by each of public keys $P_{Mi}$ specific to the members Mi, wherein the encrypted group secret keys $P_{Mi}(S_G)$) are decrypted by a member secret key $S_{Mi}$ specific to each of the members Mi to thereby acquire the group secret key $S_G$ and the acquired group secret key $S_G$ is used to execute a decryption process operation of cryptogram information encrypted by the group public key P.

Further, the present invention provides a public key encryption system wherein structural data is arranged as cryptogram information, and the structural data contains cryptogram information K(D) produced by encrypting at least a plain text by a common key K, and also one or more Pi(K) produced by encrypting the common key K by a public key Pi of each of members belonging to a group in which one or more members Mi (i=1 to n) are set as structural members.

Further, the present invention provides an encryption apparatus used in a public key encryption system arranged by a combination between a first key P and a second key S, the first key P being used in a data conversion for encrypting a plain text, and the second key S being different from the first key P and being used in a data conversion for decrypting a cryptogram to produce a plain text, comprising: encrypting means for executing an encryption process operation by data-converting a plain text with employment of a group public key $P_G$, which is allocated in a unit of a group constituted by one or more members Mi (i=1 to n) as constructive members; and encrypted secret key producing means for producing one or more encrypted group secret key $P_{Mi}(S_G)$ (i=1 to n) by executing a data conversion of a group secret key $S_G$ allocated in unit of the group by a public key $P_{Mi}$ the member Mi.

Further, the present invention provides a decryption apparatus used in a public key encryption system arranged by a combination between a first key P and a second key S, the first key P being used in a data conversion for encrypting a plain text, and the second key S being different from the first key P and being used in a data conversion for decrypting a cryptogram to produce a plain text, comprising secret key decrypting means for decrypting an encrypted secret key Pj(S) based upon an own secret key Sj, or a secret key of a group, the encrypted secret key Pj(S) being produced by encrypting a decryption key S used to decrypt a cryptogram sentence based upon a public key Pj of a receiver of a cryptogram; and decrypting means for decrypting the cryptogram sentence based upon a decryption key S which is decrypted by the secret key decrypting means to be acquired.

Further, the present invention provides an encryption method used in a public key encryption system arranged by a combination between a first key P and a second key S, the first key P being used in a data conversion for encrypting a plain text, and the second key S being different from the first key P and being used in a data conversion for decrypting a cryptogram to produce a plain text, comprising: a step for executing a data conversion of a plain text by using a group public key $P_G$ so as to encrypt the plain text, the group public key $P_G$ being produced in unit of a group constituted by one or more members Mi (i=1 to n) as constructive members; and a step for producing one or more encrypted group secret keys $P_{Mi}(S_G)$ (i=1 to n) in such a manner that a group secret key $S_G$ produced by a public key $P_{Mi}$ of the member Mi in unit of the group is data-converted to be encrypted.

Further, the present invention provides a decryption method used in a public key encryption system arranged by a combination between a first key P and a second key S, the first key P being used in a data conversion for encrypting a plain text, and the second key S being different from the first key P and being used in a data conversion for decrypting a cryptogram to produce a plain text, comprising a step for decrypting an encrypted group secret key $P_{Mi}(S_G)$ based upon a secret key $S_{Mi}$ of one or more members Mi (i=1 to n), the encrypted group secret key being produced by encrypting based on a public key $P_{Mi}$ of the member a group secret key $S_G$ which is produced in unit of a group constituted by the one or more members as the constructive members; and a step for decrypting encrypted information in such a manner that information encrypted by a group public key $P_G$ produced in unit of the group is data-converted by employing the acquired group secret key $S_G$.

Further, the present invention provides, in a public key encryption system arranged by a combination between a first key P and a second key S, the first key P being used in a data conversion for encrypting a plain text, and the second key S being different from the first key P and being used in a data conversion for decrypting a cryptogram to produce a plain text, a composite lock producing method in the public key encryption system for using a composite lock including a group public key $P_G$ and a group secret key $S_G$ which are produced in unit of a group constituted by one or more members Mi (i=1 to n) as constructive members, and one or more encrypted group secret keys $P_{Mi}(S_G)$ (i=1 to n) which are encrypted by executing a data conversion of the group secret key $S_G$ based upon each of public keys $P_{Mi}$ specific to the members Mi, comprising: a step for producing a public key $P_G$ and a secret key $S_G$ in unit of a group constituted by one or more members Mi (i=1 to n) as constructive members; a step for producing one or more encrypted group secret keys $P_{Mi}(S_G)$ (i=1 to n) which are encrypted by executing a data conversion of the group secret key $S_G$ based upon each of public keys $P_{Mi}$ specific to the members; a step for producing one or more encrypted composite lock changing secret keys $P_{Ui}(S_U)$ which are encrypted by data-converting a composite lock changing secret key $S_U$ for controlling a change of a composite lock based upon a public key $P_{Ui}$ specific to a member having a right to execute a change; and a step for performing an electronic signature by using the produced composite lock changing secret key $S_U$ with respect to data containing the produced public key $P_G$, the encrypted secret key $P_{Mi}(S_G)$, and the encrypted composite lock changing secret key $P_{Ui}(S_U)$.

Further, the present invention provides a composite lock changing method for an encryption system wherein in a public key encryption system arranged by a combination between a first key P and a second key S, the first key P being used in a data conversion for encrypting a plain text, and the second key S being different from the first key P and being used in a data conversion for decrypting a cryptogram to produce a plain text, the public key encryption system uses a composite lock including a group public key $P_G$ and a group secret key $S_G$ which are produced in unit of a group constituted by one or more members Mi (i=1 to n) as constructive members, one or more encrypted group secret keys $P_{Mi}(S_G)$ (i=1 to n) which are encrypted by executing a data conversion of the group secret key $S_G$ based upon each of public keys $P_{Mi}$ specific to the members Mi, and one or more encrypted composite lock changing secret keys $P_{Ui}(S_U)$ encrypted by executing a data conversion of a composite lock changing secret key $S_U$ for controlling a change of a composite lock based upon a public key $P_U$ specific to a member having a right to change, comprising; a stop for changing a content of a composite lock; a step for obtaining a composite lock changing secret key $S_U$ by decrypting the encrypted composite lock changing secret key $P_{Ui}(S_U)$ by using the own secret key $S_{Ui}$; and a step for performing an electronic signature by using the produced composite lock changing secret key $S_U$ with respect to data containing the public key $P_G$, the encrypted group secret key $P_{Mi}(S_U)$, and the encrypted composite lock changing secret key $P_{Ui}(S_U)$.

Further, the present invention provides, in a public key encryption system arranged by a combination between a first key P and a second key S, the first key P being used in a data conversion for encrypting a plain text, and the second key S being different from the first key P and being used in a data conversion for decrypting a cryptogram to produce a plain text, a composite lock changing method in the public key encryption system for using a composite lock including a group public key $P_G$ and a group secret key $S_G$ which are produced in unit of a group constituted by one or more members Mi (i=1 to n) as constructive members, and one or more encrypted group secret keys $P_{Mi}(S_G)$ (i=1 to n) which are encrypted by executing a data conversion of the group secret key $S_G$ based upon each of public keys $P_{Mi}$ specific to the members Mi, wherein in the case that a member is changed from now on, a pair of a new group public key $P_G$ and a new group secret key $S_G$ is produced, and the new group public/secret keys are used as a new public key and a new secret key of the composite lock; and in the case that a member was changed in the past, a pair of the present group public key $P_G$ and the group secret key $S_G$ is continuously used without any modification as a public key and a secret key of the composite lock.

Further, the present invention provides, in a computer readable recording medium for recording an encryption method used in a public key encryption system arranged by a combination between a first key P and a second key S, the first key P being used in a data conversion for encrypting a plain text, and the second key S being different from the first key P and being used in a data conversion for decrypting a cryptogram to produce a plain text, the recording medium records a program for executing: a step for executing a data conversion of a plain text with using a group public key $P_G$ so as to encrypt the plain text, the group public key $P_G$ being produced in unit of a group constituted by one or more members Mi (i=1 to n) as constructive members; and a step for producing one or more encrypted group secret keys $P_{Mi}(S_G)$ (i=1 to n) in such a manner that a group secret key $S_G$ produced by a public key $P_{Mi}$ of the group in unit of the group is data-converted to be encrypted.

Further, the present invention provides, in a computer readable recording medium for recording a decryption method used in a public key encryption system arranged by a combination between a first key P and a second key S, the first key P being used in a data conversion for encrypting a plain text, and the second key S being different from the first key P and being used in a data conversion for decrypting a cryptogram to produce a plain text, the recording medium records a program for executing: a step for decrypting an encrypted group secret key $P_{Mi}(S_G)$ based upon a secret key $S_{Mi}$ of one or more members Mi (i=1 to n), the encrypted group secret key being produced by encrypting based on a public key $P_{Mi}$ of the member a group secret key $S_G$ which is produced in unit of a group constituted by the one or more members as the constructive members; and a step for decrypting encrypted information in such a manner that information encrypted by a group public key $P_G$ produced in unit of the group is data-converted by employing the acquired group secret key $S_G$.

BRIEF DESCRIPTION OF THE DRAWINGS

FIG. 1 is a diagram schematically showing a calculation rule used to determine credit levels of composite keys;

FIG. 2 is a diagram schematically showing a calculation rule used to determine credit levels of other subjects based on credit level to a credit subject and credit levels given to the other credit subjects owned by the credit subject;

FIG. 5 is a diagram schematically showing a structure of a public lock list according to the present invention;

FIG. 6 is a diagram schematically showing a structure of a secret lock list according to the present invention;

DETAILED DESCRIPTION OF THE PREFERRED EMBODIMENTS

Figure 3:
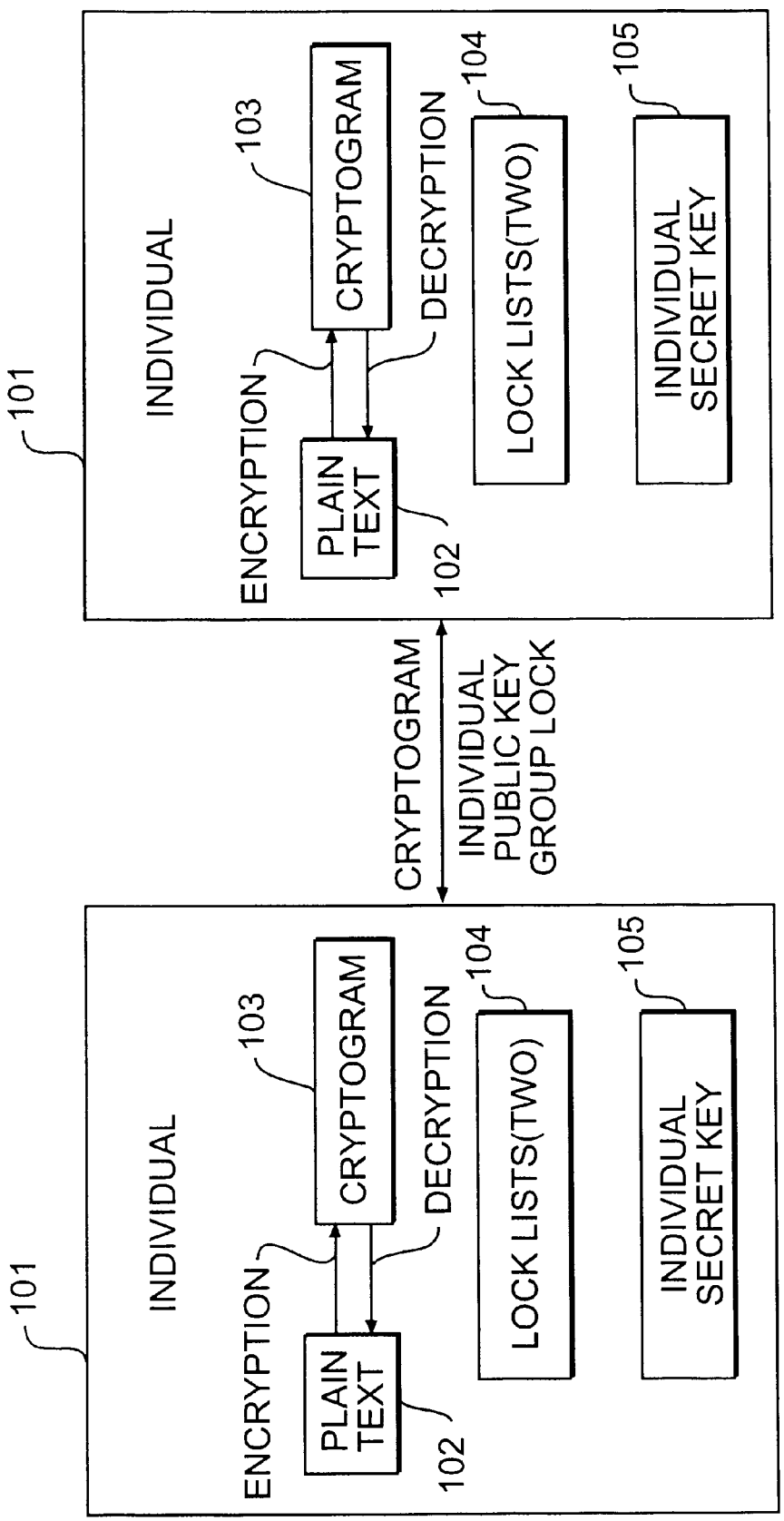
FIG. 3 is a structural diagram showing an overall structure of an encryption system according to the present invention.

Before describing various preferred embodiments of the present invention, a basic idea of the present invention will now be summarized. In the following description, a group of individuals will be referred to as a "group", and an element of a group, namely an individual (person) equal to a constructive member will be referred to as a "member". The present invention is featured by introducing a concept of a "group" into the public key encryption system. In other words, in accordance with the encryption system of the present invention, the cryptogram can be decrypted by an arbitrary member belonging to a specific group, and a signature signed by an arbitrary member belonging to a specific group is used as a typical function. The encryption system of the present invention owns such a merit that since a signature by using a group secret key is available, it is possible to disclose such a fact that the signature is really made by a member belonging to a group without disclosing such a member who actually has signed.

The present invention may provide a pair of a secret key and a public key, corresponding to a group, and these keys are referred to as a "group secret key", and a "group public key", respectively. Group secret keys are encrypted by individual public keys of all of members, respectively. A set (collection) of these encrypted group secret keys is made up. Then, this set of the encrypted group secret keys are available by at least the respective members. As a result, an arbitrary member within the group may decrypt, or capture the group secret key which has been encrypted by the corresponding individual public key by using the own individual secret key. As a consequence, when arbitrary information is encrypted by the group public key, members of the group can decrypt, or decode the encrypted information by using the group secret key captured by the above-described manner. Similarly, a member of a group can sign by using a group secret key.

In accordance with the present invention, the following process operations will be clearly described, namely a producing process operation of a pair of a group secret key and a group public key; an encryption process operation by a group public key; a decryption process operation by a group secret key; and a change process operation in the case that a member is added to a group, or deleted from a group, which are required to realize the above functions.

In such a case that secrecies of information are to be maintained by encrypting the information, there is no question about presence of the encrypted information itself, namely the presence of this encrypted information is not disclosed. This implies that such a mechanism can be hardly accepted. That is, in this mechanism, the once encrypted information is again encrypted due to some reasons. This is because it is rather difficult to specify the presence of such information to be again encrypted. As a consequence, in accordance with the present invention, when there is a change in members equal to constructive persons of a group, the once encrypted information is not again encrypted, but a key is again formed. In the conventional public key encryption system in which an individual is used as a unit, an individual being permanent presence and a key are defined by an one-to-one correspondence, and no request is made of again forming a new key. To the contrary, in the present invention, a correspondence relationship between a group and a key is newly established, a key change request is issued by changing a constructive element of the group.

The encryption and signature system according to the present invention owns an effective function in such a case that a key is provided which corresponds to an individual who plays a specific role in an association, for instance, a personnel department manager in a firm, as well as encrypting/signing in the above-described unit of group. For example, in such a case that there is a key corresponding to a role of a personnel department manager, and an individual who functions as the personnel department manager is replaced, this encrypting/signing system can be applied to such a change in the actual field by changing the key corresponding to the role of the personnel department manager. Any persons who will send an encrypted document to the personnel department manager may simply use the conventional public key corresponding to this role (personnel department manager) to thereby encrypt the information. Also, a new personnel department manager can refer to the information which has been encrypted by using the public key corresponding to the role in the past without changing the previously encrypted information.

In a group owning a certain purpose, e.g., a project group of a firm, a joint work by plural persons and a work based on roles are important. Members of the joint work group, and also individuals who play the roles are not fixedly determined. As a consequence, a very high secrecy keeping ability is required inside/outside the group.

Also, in an information network service, a system called a notarial office capable of giving a guarantee having a predetermined level to a public key has been utilized. In accordance with the present invention, since the notarial office is utilized, an invalidated key can be eliminated.

Next, the respective elements for constituting the present invention will now be described. The following description will be made of the below-mentioned items:

(1) COMPOSITE LOCK
(2) GROUP LOCK
(3) INDIVIDUAL LOCK
(4) SECRET KEY OF INDIVIDUAL LOCK
(5) COMPOSITE LOCK LIST
(6) CREDIT SUBJECT
(7) NOTARIAL OFFICE (1) COMPOSITE LOCK

A composite lock is a generic name of locks used to realize a group lock (role lock), and an individual lock (which will be described later). Concretely speaking, this composite lock is electronic data owning the following elements a) Name A "name" is a character stream readable by a person and having a meaning of an actual field condition corresponding to a composite lock, and owns a role as an identifier of a composite lock. It is preferable not to use such a space, or a misleading character stream so as to avoid such a case that a person mistakenly judges that different character streams are equal to each other.

b) Producing Date/Time. Producer

Date and time when a composite lock is produced, and a producer of the composite lock. A producer signs as to the entire composite lock produced. A signing procedure involves such an action that electronic data for constituting a composite lock is encrypted by an individual key of a producer.

c) List of Secret Keys

A "list of secret keys" implies a list made by that secret keys of composite locks are encrypted by using a public key of a member, names (alternatively, data capable of discriminating a member) of the members are applied as labels. The list of secret keys is decrypted by using a secret key of the member, so that a secret key of the composite lock can be acquired, or captured. A cryptogram sent from another person may be decrypted by using the secret key of the composite lock.

d) Public Key

A "public key" implies a public key of a composite lock. When information is encrypted, a data conversion is performed by employing this public key to produce a cryptogram.

e) Secret Lock List of Change Lock

Independently of a pair of a public key and a secret key used to keep a secrecy of information, another pair of a public key and a secret key used to control a changing right of a composite lock is required. This pair is called a "change lock". The composite lock saves such a list made by encrypting a secret key of the change lock by using a public key of an owner of a changing right, and names of changing right owners are applied as labels. Only a changing right owner of a composite lock is allowed to change the composite lock, for instance, to add/delete a member to thereby produce a new version of the composite lock. The changing right owner is previously designated. When a certain composite lock is changed by a changing right owner to produce a new version of the composite lock, it is possible to set that a person who trusts the old version of the composite lock automatically trusts the new version of the composite lock. This is referred to as an "automatic credit mechanism". A credit of a lock will be described later. To clarify that a composite lock has been changed by an authorized changing right owner, this owner signs by a secret key of a change lock when the composite lock is changed. It should be understood that when all members of a composite lock own changing rights of this composite lock, all members use a pair of a public key and a secret key for keeping a secrecy. In this case, these members sign by employing the current version of the secret key.

f) Public Key of Change Lock

A public key of a change lock constitutes a pair with the above-described secret key of the change lock, and is used to decrypt a composite lock signed by the above-described secret key of the change lock, so that a signature can be confirmed by this public key of the change lock. Alternatively, in addition to the above-described functions, a validity term of a composite lock, and another validity term in such an off-line term that no communication can be established with a notarial office may be added so as to control a utilization of the composite lock.

(2) GROUP LOCK

A "group lock" is a composite lock corresponding to a group of an actual field. In general, a group involves a plurality of members. The group lock may have another function as a role lock (for example, a role of a personnel department manager).

(3) INDIVIDUAL LOCK

An individual lock is such a composite lock corresponding to an individual, or a person. Also, an individual lock may be realized by a composite lock. A member of a composite lock functioning as an individual lock designates a depositor. A depositor implies such a person other than the individual. That is, the same right as that owned by the individual is given to this person with a certain condition. This may realize such a fact that when the individual forgets his passphrase, a person who may play a role of an attorney of the individual can decryption information as a depositor. This depositor is introduced to avoid the following risk. That is, for instance, one individual can have a secrecy of information and can decrypt the information within a firm. Also, a depositor may be employed in order to inspect/examine information. The following condition may be set. That is, allowances of a plurality of designated depositors are needed as such a condition that a depositor utilizes an individual lock.

(4) SECRET KEY OF INDIVIDUAL LOCK

A secret key of an individual lock is present only in such a form that a character stream called a "passphrase" known only by a user is encrypted as a key. At the time when a secret key of an individual lock is required, a passphrase is entered, and thus a secret key of an individual lock can be directly acquired.

(5) COMPOSITE LOCK LIST

A composite lock list is such a composite lock list owned by an individual and whose trust degree is clear. Both a composite lock and a trust degree corresponding to this composite lock are saved as a pair in this composite lock list. When a composite lock is utilized, this composite lock is judged based upon a trust degree contained in this list. A trust degree of such a composite lock which is not present in this list is interpreted as an "unclear composite lock". For example, this composite lock list is utilized in such a case that either an individual or a group who is allowed to decrypt an encrypted sentence is designated by this composite lock list, and a public key is acquired from the corresponding composite lock to produce an encrypted secret key. In other words, this composite lock list is equal to a public lock list where a public key of the trusted individual or the trusted group has been indirectly registered. Alternatively, this composite lock list may directly register a public key of an individual, or a group. It should also be understood that a composite lock itself may be realized by the composite lock stored in an apparatus, by referring to such a composite lock stored in another apparatus located apart from the first-mentioned apparatus, or by employing a mixture of the composite locks stored within the apparatus and outside this apparatus.

(6) CREDIT SUBJECT

Although a composite lock used in a group in accordance with the present invention can be produced by anyone, if the produced composite lock is not trusted, then this produced composite lock cannot constitute a valid lock. Trusting of a composite lock implies trusting of an actual correspondence between a group (involving a role) existing as a subject of an actual field, and a composite lock which may be related to this group. Concretely speaking, not only the group must be made coincident with the composite lock, but also the member contained in the composite list must be made coincident with the member of the group existing in the actual field when the trust is made. It is now assumed that there is a composite lock titled "1st personnel section of personnel department". There are possibilities that a group in an actual field, named as "personnel section of personnel department" is present, but another group named as "1st personnel section of personnel department" is not present in the actual field. Even when there is such a group titled "first personnel section of personnel department" is present in the actual field, there is a possibility that an authorized composite lock corresponding thereto is not present. As a consequence, no one can trust the composite lock only based upon the name of this composite lock. Also, no one can trust in such a case that although the members belonging to "1st personnel section of personnel department" are changed, the past members are still left in the members of the composite lock.

Information as to which composite lock can be trusted is referred to as "credit information". Also, information indicative of a trust degree of credit information itself is equal to credit information. A subject for holding credit information is referred to as a "credit subject". A credit subject may arbitrarily trust credit information, and how to trust a composite lock based upon which reason. As this credit subject, there are two sorts of credit subjects, namely an individual and a notarial office which will be described in the below-mentioned item (7). One credit subject may trust another credit subject. In this case, such a credit subject to be trusted is called a "trusted credit subject". In the case that one credit subject does not have direct credit information with respect to the composite lock, when the trusted credit subject trusts the composite lock, the first-mentioned credit subject may trust.

As a relational example, assuming now that both an individual "MR. TANAKA" and a notarial office "trading company X" are credit subjects, when the individual "MR. TANAKA" trusts the notarial office "trading company X", this individual "MR. TANAKA" automatically trusts all subjects which are trusted by the notarial office "trading company X". However, conversely, the notarial office "trading company X" does not always trust all subjects which are trusted by the individual "MR. TANAKA".

There are sorts in degrees of trusts, which are called "trust levels". While using this trust level, a calculation can be made of an unknown trust degree of such a composite lock. As the trust level used in this calculation, for example, the below-mentioned trust levels of a table may be used.

TABLE1

Level "⊚": completely trust (for example, itself).
Level "○": sufficiently trust.
Level "Δ": trust to some extent.
Level "?": unclear.
Level "x": not trust.

FIG. 1 shows an example of such a case that a trust level with respect to a composite lock having an unknown trust level is calculated based upon trust levels of two independent credit subjects different from each other as to the same composite lock, for example, trust levels owned by two individuals "A" and "B" with respect to this composite lock. A first row of FIG. 1 shows trust levels of the individual A, and a left end column thereof shows trust levels of the individual B. The calculation results as to the respective cases are represented as the table. For instance, when a trust level set by the individual A is "○" and a trust level set by the individual B is "?", a trust level of the composite lock becomes "○".

To calculate a trust level for a credit subject, and a trust level of this credit subject to another credit subject, or a trust level at which the trust level to the composite lock has been used, for example, a calculation rule as indicated in FIG. 2 is used. A first row of FIG. 2 shows trust levels for a credit subject, and a left end column thereof shows trust levels of this credit subject to another credit subject, or trust levels to a composite lock. The calculation results in the respective cases are represented as the table. For example, when a trust level of the credit subject is "○" and a trust level set by the credit subject is "?", a trust level of the composite lock becomes "?". Therefore, the unknown trust level of the credit subject, or the trust level of the composite lock may be determined by using the calculation rule defined in FIG. 1 or 2.

(7) NOTARIAL OFFICE

As previously described, a notarial office corresponds to one of credit subjects. A function provided by a notarial office is to express/provide public credit in unit of a firm or an association where an encryption system is utilized. A credit basis of a composite lock in a notarial office may be arbitrarily determined by a firm or an association which manages the notarial office. As to the method for determining this credit basis, several methods may be conceived in the following description. It should be noted that the term "to guarantee" implies that an individual other than a registered person identifies such a fact that a composite lock to be registered is authorized.

A confirmation is made that a composite lock is authorized by executing a certain procedure by a specific manager of a notarial office. When such a confirmation is made, the notarial office may trust the composite lock. It should be understood that a "certain procedure" corresponds to an arbitrary procedure executed in an actual field. For instance, a stamp of an individual or a firm is signed on an application document. Otherwise, an identification card of an applicant is confirmed. Alternatively, the following actions may be registered, for instance, confirmation of duplicated name; guarantee by another specific individual designated every registered person; guarantee of members exceeded a preselected number of members; and guarantee of individual signatures trusted by the notarial office, which exceed a preselected number of signatures.

Next, an embodiment of an encryption method with using a group lock is shown. It should be understood that although the above-described group lock contained in the composite locks is employed so as to explain this encryption method, the encryption system may be arranged by a similar structure and a similar procedure even when the individual lock corresponding to another sort of the composite locks is used, except that a member in the group lock is changed into a depositor. Also, as a specific use of the group lock there is the above-described role lock. To cause the group lock to function as the role lock, a total number of members who constitute the group lock is selected to 1, and an individual who presently plays a role may be set as this only one member. However, this encryption system may be alternatively operated in such a way that both a vice-president himself and his secretary are involved in a member having a role lock of the vice-president.

Each of persons who use the encryption system according to the present invention owns two sets of lock lists. In other words, these two lock lists are a) "public lock list", and b) "secret lock list". a) The "public lock list" corresponds to a list for group locks and individual locks, which are trusted by the respective persons. b) The "secret lock list" is equal to a list of group locks capable of directly, or indirectly acquiring secret keys based upon sequent keys owned by the respective persons. For the sake of simplicity, in this embodiment, while it is assumed that the group locks and individual locks contained in the "public lock list" are trusted, a medium degree of trust, i.e., "slightly trust" is not given. Also, it is assumed that whether or not a group lock being trusted may be judged based upon the above-described trust degree of the calculation rule and also the user's decision. A detailed description will be omitted from the below-mentioned embodiments. However, in the case of the automatic credit mechanism when the group lock is changed and the previous group lock is trusted, namely in the case that the group lock before being changed is trusted, it is assumed that the group lock after being changed is automatically trusted. Also, the above-described registering procedure to the notarial office will not be directly described in the below-mentioned embodiments. As previously described, when the notarial office is present in the network, either the produced lock or the changed lock is registered in the notarial office. It should also be understood that this registering procedure does not constitute the requirements of the present invention.

Referring first to FIG. 3, an overall arrangement of an encryption system according to this embodiment will now be described. A basic function of this embodiment is realized by that information is correctly transferred between individuals while keeping a secrecy. It should also be noted that an individual may belong a group. To transfer information, a direct transfer method such as a mail, and also an indirect transfer method via a file service may be used.

As indicated in FIG. 3, not only a cryptogram, but also an individual public key and a group lock are transferred among individuals, if necessary. When such a judgment is required as to whether or not both the individual public key and the group lock establish correct relationships with an individual and a group, which are actually present in the actual field, this judgment procedure must be established.

In the case that a plain text 102 in an "individual" 101 shown in FIG. 3 is encrypted to produce a cryptogram 103, locks are selected from a lock list 104, which correspond to locks held by an individual and a group, which can be decrypted, and then the selected locks are encrypted. As a consequence, the cryptograms are produced which can be decrypted by the selected individual, and the individual belonging to the selected group. Otherwise, the plain text is encrypted by using a common key KA, and further locks are selected from the lock list, which correspond to the locks owned by the individual and the group, which can decrypt a decryption key KB required to decrypt this cryptogram. The selected locks are encrypted. Then, these encrypted locks are transmitted.

When the transferred encrypted information is decrypted, if the acquired cryptogram can be directly decrypted by using an own individual secret key 105, then this cryptogram is decrypted by using the own individual. When the encryption process is carried out by using the common key KA, first of all, the decryption key KB required in the decryption process is decrypted by using the own individual secret key. If the decryption key can be decrypted by such a group to which the individual himself directly, or indirectly belongs, then the group lock is converted into a group secret key by using the own individual secret key in order to acquire the group secret key, and this group secret key is used to acquire the decryption key KB. Then, the plain text is decrypted by way of this decryption key KB.

GROUP LOCK

Figure 4:
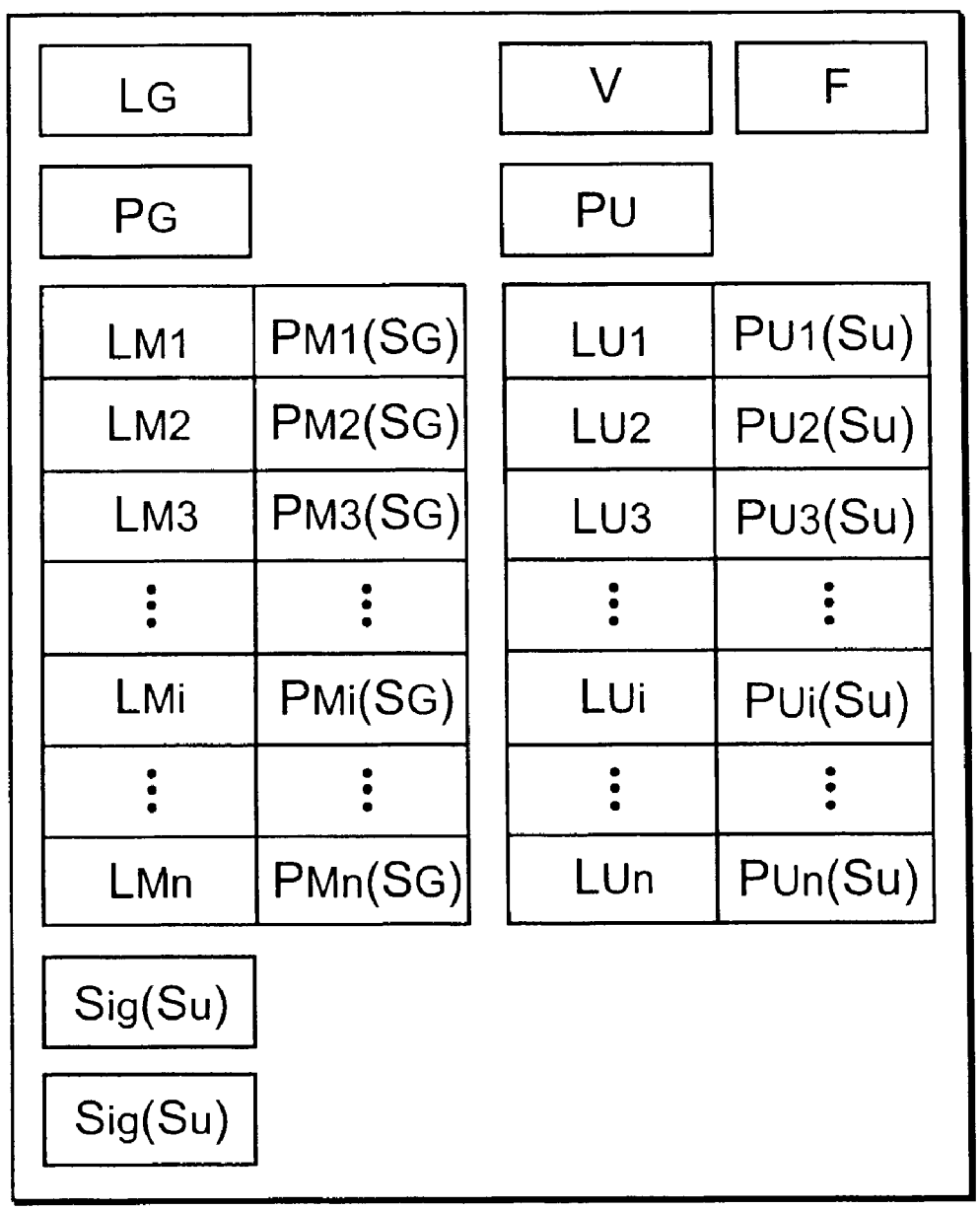
FIG. 4 is a diagram schematically showing a structure of a group lock according to the present invention.

In FIG. 4, there is shown a structure of a group lock according to this embodiment. Symbols indicated in FIG. 4 will now be described as follows;

$L_G$: label of this group lock.

This symbol is a character stream. A duplication is not allowed in a certain personal lock list. Since a duplication may occur as an overall list, this character stream is not utilized as an identifier. It should be understood that if the labels are not made coincident with each other, then the public keys are similarly not made coincident with each other. Accordingly, the high-speed process operation may be realized by using this fact.

$P_G$, public key of this group lock.

This symbol is a public key depending upon the utilized public key encryption system. Generally speaking, this symbol corresponds to a data stream having a fixed length defined from approximately 512 bits to 2,048 bits. When the encryption operation is carried out which can be decrypted by all of individuals directly, or indirectly belonging to this group, this encryption operation is performed by employing this public key $P_G$. Also, when a signature is confirmed which has been signed as an arbitrary individual directly, or indirectly belonging to this group, this signature is confirmed by using this public key. The public key is contained in the group lock while directly keeping the original format thereof, and therefore, everyone can refer to this public key.

$S_G$: secret key of this group lock.

This symbol is a secret key depending upon the utilized public key encryption system. Generally speaking, this symbol corresponds to a data stream having a fixed length defined from approximately 512 bits to 2,048 bits. When a cryptogram encrypted by way of a public key corresponding thereto is decrypt, this secret key $S_G$ is used. Also, when a signature is made which has been signed as an arbitrary individual directly, or indirectly belonging to this group, this secret key is also used. This secret key has directly, or indirectly been encrypted by the individual secret key. When the secret key is used, the encrypted secret keys are sequentially decrypted by employing the individual secret key to thereby acquire the secret keys. After using these secret keys, the secret keys are immediately discarded, and are not solely held.

Mi: member of this group.

A member Mi is present in a view of conceptional idea, and directly appears in a data structure. As a member, either an individual or a group may become. As previously described, when an individual lock is used instead of a group lock, this member becomes a depositor.

$P_U$: public key used to change this group lock.

A public key $P_U$ is such a public key, depending upon a utilized public key encryption system. This public key $P_U$ owns, in general, a data stream having a fixed length of approximately 512 bits to 2,048 bits. A group is required to change its content, for example, a member is added, or deleted. As a method for discriminating a person who owns a right capable of changing a group, a pair of an exclusively-used public key and an exclusively-used secret key is utilized. This is this public key. A secret key for a changing purpose is directly, or indirectly encrypted by an individual secret key of an individual who owns a change right, and the encrypted secret key is contained in the group lock. When a group lock is changed, a new group lock is signed by the secret key for changing purposes. Since this changing secret key cannot be obtained by any one other than the owner of the change right, if this signature can be confirmed, then such a confirmation is made that the group lock is changed by the authorized owner having the change right. This confirmation process can be automatically carried out if the previous group lock is trusted. Since this changing public key is contained without any modification, every one can refer to this changing public key.

$S_U$: secret key used to change this group lock.

This secret key $S_U$ is such a secret key, depending upon a used public key encryption system. In general, this secret key $S_U$ is a data stream having a fixed length of approximately 512 bits to 2,048 bits. A function of this secret key is equal to that of the public key Put, as previously described.

V: version number of this group lock.

This version number V is a natural number. When a group lock is newly produced, this version number V becomes 1. This version number V indicates a version of a group lock. When a version number is changed, this version number is increased by 1, as compared with the version number before being changed.

F: value indicative of handling of just-before-set version.

This value takes any value of "not required", "required", and "delete". When a group lock is changed, an individual who owns a just-before-set version acquires a new version, so that the just-before-set version (namely, a version just before a now version is acquired) must be properly handled. "not required" implies that the just-before-set version is not required. "required" is needed in order to confirm a signature made by the just-before-set version, since an encryption produced by the just-before-set version is decrypted. In this case, when the encryption operation and the signing operation are newly carried out, the latest version must be used. "delete" is approximated to "required", and implies that if an individual cannot capture a secret key of a new version, then the just-before-set version must be deleted. When a group lock is newly produced, this value of "delete" has no meaning.

$U_i$: owner having a right to change this group.

This change right owner $U_i$ is present in view of a conceptional idea, and does not directly appear in a data structure. The change right owner $U_i$ can designate an individual and a group.

$L_{Mi}$: label of Mi.

The label $L_{Mi}$ is a character stream. This label $L_{Mi}$ is a label of either another group lock or an individual public key, which is equal to a direct member of this group lock. An individual lock is not clearly described in this embodiment. It is assumed that this individual lock is made of a secret key managed by an individual corresponding to this individual lock, and also a public key to be published, and a label is applied to at least the public key.

$P_{Mi}$: public key of Mi.

This public key $P_{Mi}$ is such a public key, depending upon a used public key encryption system. In general, this public key $P_{Mi}$ is a data stream having a fixed length of approximately 512 bits to 2,048 bits. This public key $P_{Mi}$ is equal to a public key of a direct member of this group.

$P_{Mi}(S_G)$: $S_G$ encrypted by $P_{Mi}$.

This $P_{Mi}(S_G)$ is such a result of encrypting $S_G$ by an encryption process, depending upon the used public key encryption system. To acquire $S_G$ by using this $P_{Mi}(S_G)$, the secret key $S_{Mi}$ corresponding to $P_{Mi}$ is required. This is held by an array, while setting $L_M$ as an index.

$L_{Ui}$: label of Ui.

The label $L_{Ui}$ is a character stream. This label corresponds to a label of an individual lock of an individual equal to a change right owner of this group lock.

$P_{Ui}$: Public key of Ui.

This public key $P_{Ui}$ is such a secret key, depending upon a used public key encryption system. In general, this public key $P_{Ui}$ is a data stream having a fixed length of approximately 512 bits to 2,048 bits. This public key corresponds to either a public key of an individual or a public key of a group lock, which is equal to the change right owner of this group lock.

$P_{Ui}(S_{Ui})$: $S_U$ encrypted by public key of Ui.

Symbol "$S_G$" is an encrypted result of "$S_G$" by executing an encryption process operation in accordance with the utilized public key encryption system. To acquire "$S_G$" by using this result, the secret key $S_{Ui}$ corresponding to $P_{Ui}$ is required. This is held by such an array while using the corresponding $L_{Ui}$ as an index. It should be understood that in this embodiment, similar to a data structure of a packet in a packet communication, information used to discriminate the data is added to the secret key, and then the resultant information is encrypted. As a result, when this encrypted secret key is decrypted, it is easily judged as to whether or not the secret key is normally decrypted based upon the addition information.

$Sig(S_U)$: signature by $S_U$ for entire.

Symbol $Sig(S_U)$ is a data stream indicative of a signature. In this specification, the entire is $L_G$, $P_G$, V, F, $P_U$, $L_{Mi}$, $P_{Mi}(S_G)$, $L_{Ui}$, $P_{Ui}(S_U)$. The signature is an encryption process by the secret key 7. In the public key encryption system, the encryption process is performed by the secret key, and then the encrypted secret key can be decrypted by the public key opposite to the normal method. Since it is confirmed that the signature can be decrypted by the public key, it is possible to confirm that the signature is signed by the secret key. In the practical case, a message digest is carried out for this subject range, and the digested result is signed by the secret key $S_U$. A message digest implies such a process operation for producing information having approximately 128 bits, depending upon a content of a subject range, independent from a data size of this subject range, since high cost is required so as to encrypt all of the signed subject range. As a message digest process algorithm, published algorithms are used, but no key is utilized. As a result, when a confirmation is made, subject data are message-digested to check as to whether or not the message-digested data is made coincident with the result obtained by decrypting the signature. The process operation of the message digest is similar to the check sum. Since the unidirectional function is employed in the process stage, it is rather difficult to forge such input data for generating the same result. Also, since the size of the produced data is large, it is rather difficult to forge the input data in a so-called "round-robin tournament" manner. It should be understood that the expression "message digest" is the generic name in the relevant encryption field, and is the well-known system. The signature "$Sig(S_U)$" is obtained by executing the below-mentioned process operations, assuming now that the message digest process function is selected to be "$f_{md}$"; the composite operation of the subject data is expressed by the arithmetic summation; and the signature by using $S_U$ is expressed by the function $S_U$:

$$S_U(f_{md}(L_C + P_G + P_U + \sum_{i=1}^{n}(L_{Mi} + P_{Mi}(S_G) + L_{Ui} + P_{Ui}(S_U))))$$

$S_{U'}$: $S_U$ of previous version.

This secret key $S_{U'}$ is such a secret key, depending upon a used public key encryption system. In general, this secret key $S_{U'}$ is a data stream having a fixed length of approximately 512 bits to 2,048 bits. This secret key is a secret key for changing a just-before-set version. A function of this secret key is equal to that of the public key $P_U$ (see detailed description of $P_U$).

$Sig(S_{U'})$: signature by $S_{U'}$ for entire.

This signature $Sig(S_{U'})$ is a data stream indicative of a signature. In this case, the entire implies $L_G$, $P_G$, V, F, $P_U$, $L_{Mi}$, $P_{Mi}(S_G)$, $L_{Ui}$, $P_{Ui}(S_U)$, and $Sig(S_U)$. When these data streams are newly produced, this is not applied. When this signature $Sig(S_U)$ is expressed in a similar manner to the signature $Sig(S_U)$, this signature $Sig(S_U)$ may be expressed as follows:

$$S_U(f_{md}(L_G + P_G + P_U + \sum_{i=1}^{n}(L_{Mi} + P_{Mi}(S_G) + L_{Ui} + P_{Ui}(S_U) + Sig(S_U))))$$

It should also be noted that although the entire data are signed in this embodiment, only partial data which is not forged may be signed.

Public Lock List

FIG. 5 represents a structure of a public lock list according to this embodiment. A public lock list is separately owned by each of individuals. This public lock list holds group locks and individual locks, which are trusted by an individual and are arrayed while using labels of these locks as indexes.

As shown in FIG. 5, the public lock list is arranged by Gi: trusted group lock; $L_{Gi}$: label of group lock Gi; Ii: trusted public key of individual; $L_{Ii}$: label corresponding to individual public key Ii.

In this embodiment, credit of a lock required when data is newly added to the public lock list is judged based upon a decision of an owner of this public lock list. It should be understood that the next version of the previously trusted group lock is automatically trusted. Alternatively, either a lock or a credit subject which may be trusted may be determined by using the calculation rule related to the above-described trust level. In this alternative case, since the trust relationship registered in the above-described notarial office is utilized, the trust level may be firmly and easily calculated.

When the encryption process is carried out, either the group or the individual which can be decrypted is designated. This is carried out by selecting more than one group lock, or more than one individual lock corresponding thereto from this public lock list.

When validity of a signature is confirmed, such a public key corresponding to a secret key used when this signature is signed is derived from this public lock list to be utilized.

Secret Lock List

FIG. 6 represents a structure of a secret lock list according to this embodiment. A secret lock list is independently owned by each of individuals. A group lock capable of acquiring a secret key by this individual is hold by ouch an array that a label of this group lock is used as an index. A secret key is acquired by directly, or indirectly applying an individual secret key of this individual to a group lock.

As represented in FIG. 6, the secret lock list is arranged by Gi: group lock where secret key is usable, and $L_{Gi}$: label of group lock Gi.

When a group lock is added to the secret key list, an own personal secret key is directly, or indirectly applied during the adding process operation of the group lock into the public lock list. Then, if a group secret key within this group lock can be captured, then the group lock is added. As a consequence, a user need not consider the adding process operation. A specific attention should be paid to such a fact that even when the group secret key within this group lock can be acquired, this fact never gives the trust basis for this group lock.

During decryption process operation, a judgment of a decryption possibility can be performed in a high speed by employing the secret lock list. Also, during the actual decryption process operation, this secret lock list is utilized in the process operation for acquiring the necessary group secret key.

When a signature is signed, this signature may be made by using the group secret key contained in this secret lock list except that the own personal secret key is employed. If this method is employed, then either an individual or a group as a sender can be discriminated on the reception side of the encryption message. Also, when the signature is attached with the public key of the secret key utilized in signing of this signature, this signature can be easily confirmed. Furthermore, the sender can be easily confirmed only by the public key without confirming the signature.

Cryptogram

Figure 7:
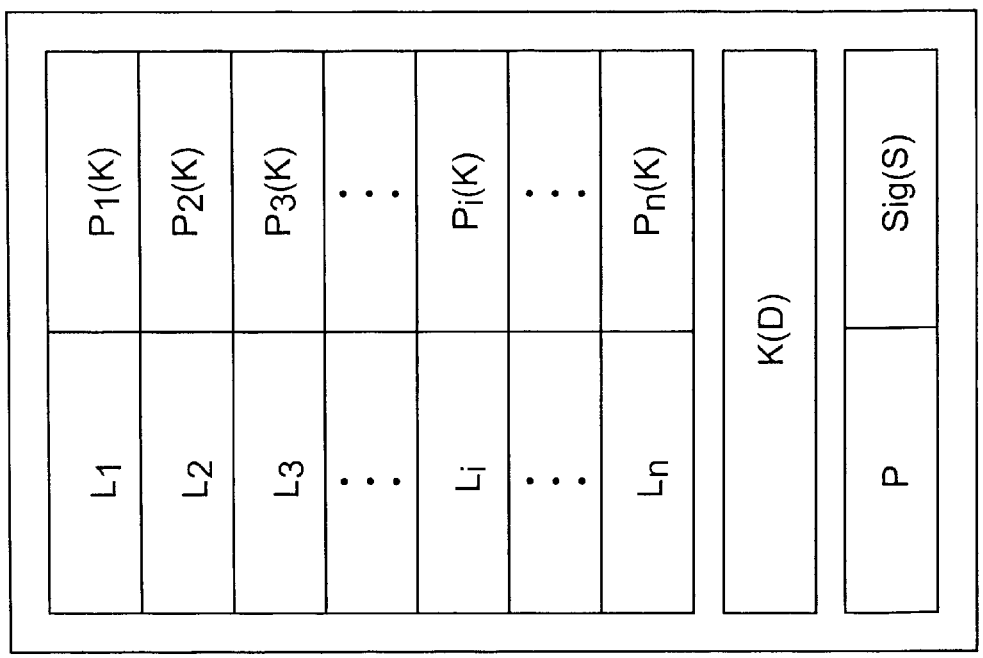
FIG. 7 is a diagram schematically showing a structure of a cryptogram according to the present invention.

A structure of a cryptogram according to this embodiment is indicated in FIG. 7. In this embodiment, a such a structure similar to a list of a pair of $L_{Mi}$ and $P_{Mi}$ ($S_G$) of the group lock is applied to this cryptogram structure, so that the cryptogram can be decrypted by employing any one of the plural secret keys. As a result, in the case that information is encrypted which is desirably opened to plural persons, the group lock is not always produced. In other words, a group of receivers may be temporarily formed, which are arranged by individuals and groups arbitrarily selected from the public lock list.

Meanings of the respective symbols contained in the cryptogram of FIG. 7 will now be described as follows:

Pi: decryptable group lock, or decryptable personal is public key.

This public key is such a public key, depending upon the public key encryption system under use. Generally speaking, this public key is a data stream having a fixed length from approximately 512 bits to 2,048 bits.

Li: label of Pi.

This label is a character stream.

D: plain text (namely, confidential information).

This plain text is an arbitrary data stream.

K: common key made by encrypting plain text D.

In general, a hybrid system has been introduced. In this hybrid system, since the encryption process operation and the decryption process operation of the public key encryption are delayed, the plain text is encrypted by the common key encryption, and only the common key thereof is encrypted by the public key encryption. This symbol "Keg" is this common key. In this embodiment, the common key K is decrypted by Pi, respectively, so that the decryption process operation can be carried out by either a plurality of groups, or a plurality of individuals.

Pi(K): K encrypted by Pi.

K(D): D encrypted by K.

S: secret key usable by person who executed encryption process.

This secret key is such a secret key used when a signature is attached to a cryptogram. One of secret keys is employed, i.e., own individual secret key, and a secret key of a group lock contained in a secret lock list.

P: public key P constituting a pair with secret key S used to sign.

When a signature is confirmed, such a public key is used which corresponds to a secret key used by a signer. To specify this public key, the public key is held. When this public key is involved in the own public key list on the receiver of the cryptogram sentence, it is possible to confirm that the signature is made by either the own trusted group or the own trusted individual, and then the sender of this cryptogram sentence, or the group which sends this cryptogram sentence can be confirmed.

Sig(S): signature by S for entire.

This signature Sig(S) is a data stream indicative of a signature. As the entire signature, there are Li, Pi(K), and K(D). As to the signature, the item of $Sig(S_U)$ of the group lock is referred. Similar to the expression, the signature Sig(S) is expressed as follows:

$$S(f_{md}(\sum_{i=1}^{n}(Li + Pi(K))D))$$

Concrete Process Flow Operations

Referring now to flow charts shown in FIGS. 8 to 16, a description will be made of concrete process flow operations according to this embodiment.

Production of Group Lock

Figure 8:
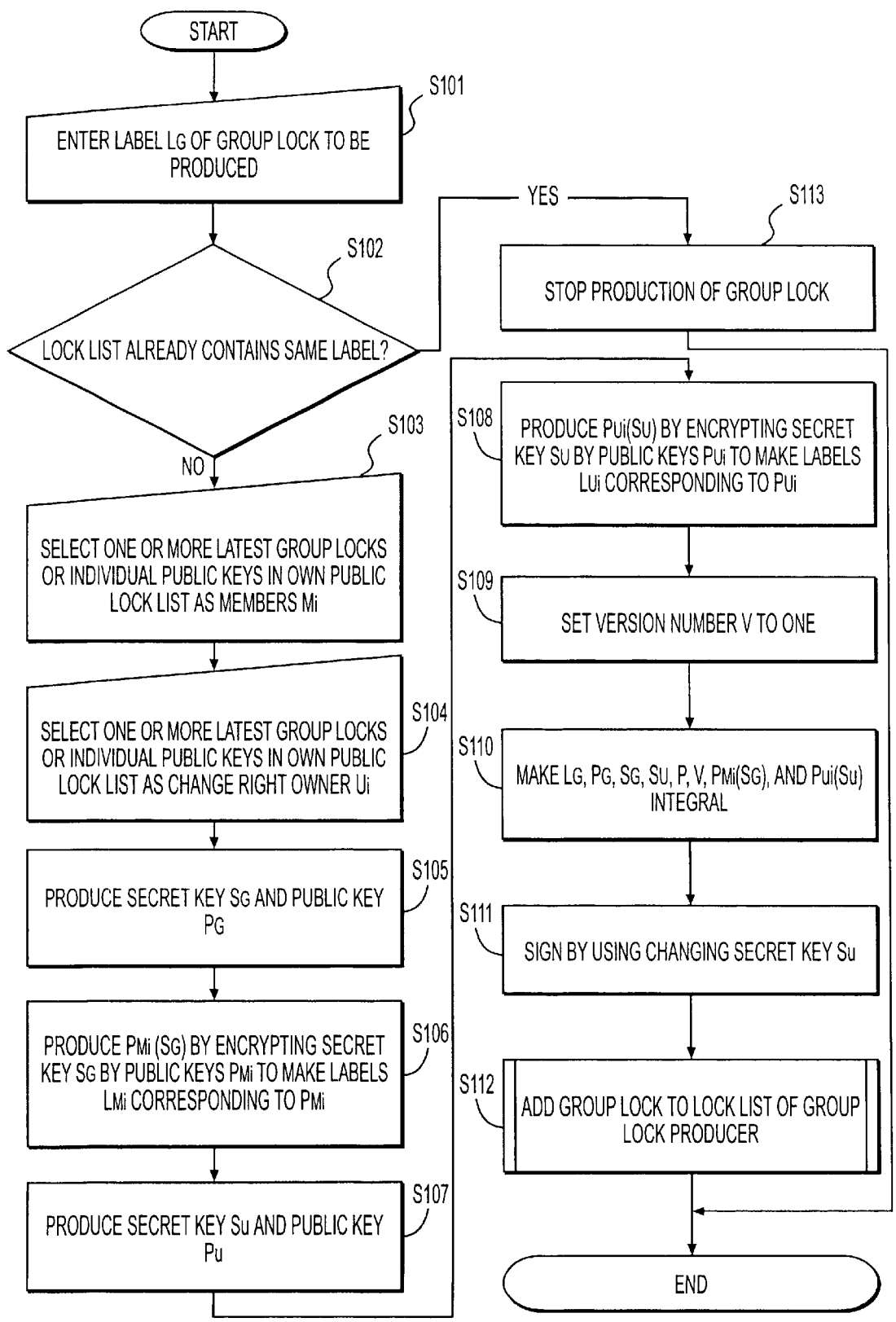
FIG. 8 is a flow chart for describing a group lock producing flow operation according to the present invention.

FIG. 8 shows a flow chart for describing a producing operation of a group lock. When a group is formed (similarly when a group is added/changed), either a group lock corresponding to a newly designated member, or an individual public key must be trusted by a producer. As a result, when the producer does not trust either the group lock of the newly designated member or the individual public key, the producer must trust, namely must add the group lock or the individual public key into the lock list before the group lock is formed.

First, the produced group lock is added to the own lock list. A lock list corresponds to a generic name of a public lock list and a secret lock list. Furthermore, the produced group lock is distributed to any persons who require this produced group lock. As to these persons, when a cryptogram encrypted to the forming group is decrypted, the members of the group require this group lock. Conversely, when information is encrypted to this group, the group lock is required. An arbitrary person can execute the encryption operation. To this end, the lock list is required to be distributed to any persons who potentially encrypt the information to the members and this group. Alternatively, while the composite lock is held at a remote center, this composite lock may be sent to a sender of a cryptogram sentence, or a receiver thereof, if required. Also, only necessary information of the composite lock may be sent. In this specification, descriptions of the distribution mechanism are omitted.

Referring now to the flow chart of FIG. 8, the group lock producing operation will be described in detail. First, at step 101, a label of a group lock to be produced is entered. At step 102, a check is made as to whether or not the lock list already contains the same label as this entered label. A production of locks having a duplicated label is denied. In the case that there are already the same labels in the lock list, this producing operation is advanced to step 113. At step 113, the production of the group lock is stopped. Conversely, when there is no same label, the producing operation is advanced to step 103.

At step 103 and another step 104, both a member Mi and a change right owner Ui are designated. This member Mi corresponds to a member who utilizes the encryption system with using this group lock, and this change right owner Ui corresponds to a person who owns a right to change this group lock, for example, such a right to add/delete a member. Both the member and the change right owner can be registered as an individual, but also a group. The member and the change right owner are designated, while selecting more than one group lock, or more than one personal public key from the public lock list.

At step 105, a secret key $S_G$ and a public key $P_G$ of the group lock to be produced are produced. At step 106, $P_{Mi}(S_G)$ is produced by encrypting the produced secret key $S_G$ by the respective public keys $P_{Mi}$ of the member Mi, and then labels $L_{Mi}$ are made in correspondence with the encrypted keys.

At step 107, both a changing secret key $S_U$ and a changing public key $P_U$ of the group lock to be produced are produced. At step 108, the produced group-lock-changing secret key $S_U$ is encrypted by the public key $P_{Ui}$ of the change right owner to thereby produce $P_{Ui}(S_G)$, and to make labels $L_{Ui}$ in correspondence with $P_{Ui}(S_G)$.

At step 109, a version number of the group lock to be produced is set. At step 110, the respective data of $L_{G'}$, $P_{G'}$, $S_{G'}$, $S_{U'}$, $P_{U'}$, V, $P_{Mi\ (SG)}$, and $P_{Ui}(S_U)$ are made integral, which are produced at the respective steps. At step 111, a signature is made by using the changing secret key $S_U$ with respect to the previous data made integral, namely the data conversion is carried out. At step 112, the group lock is added/registered into the lock list of the group lock producer, so that the production of the group lock is accomplished. Thus, the produced group lock owns the previously described structure shown in FIG. 4.

Key Addition to Lock List

Figure 9:
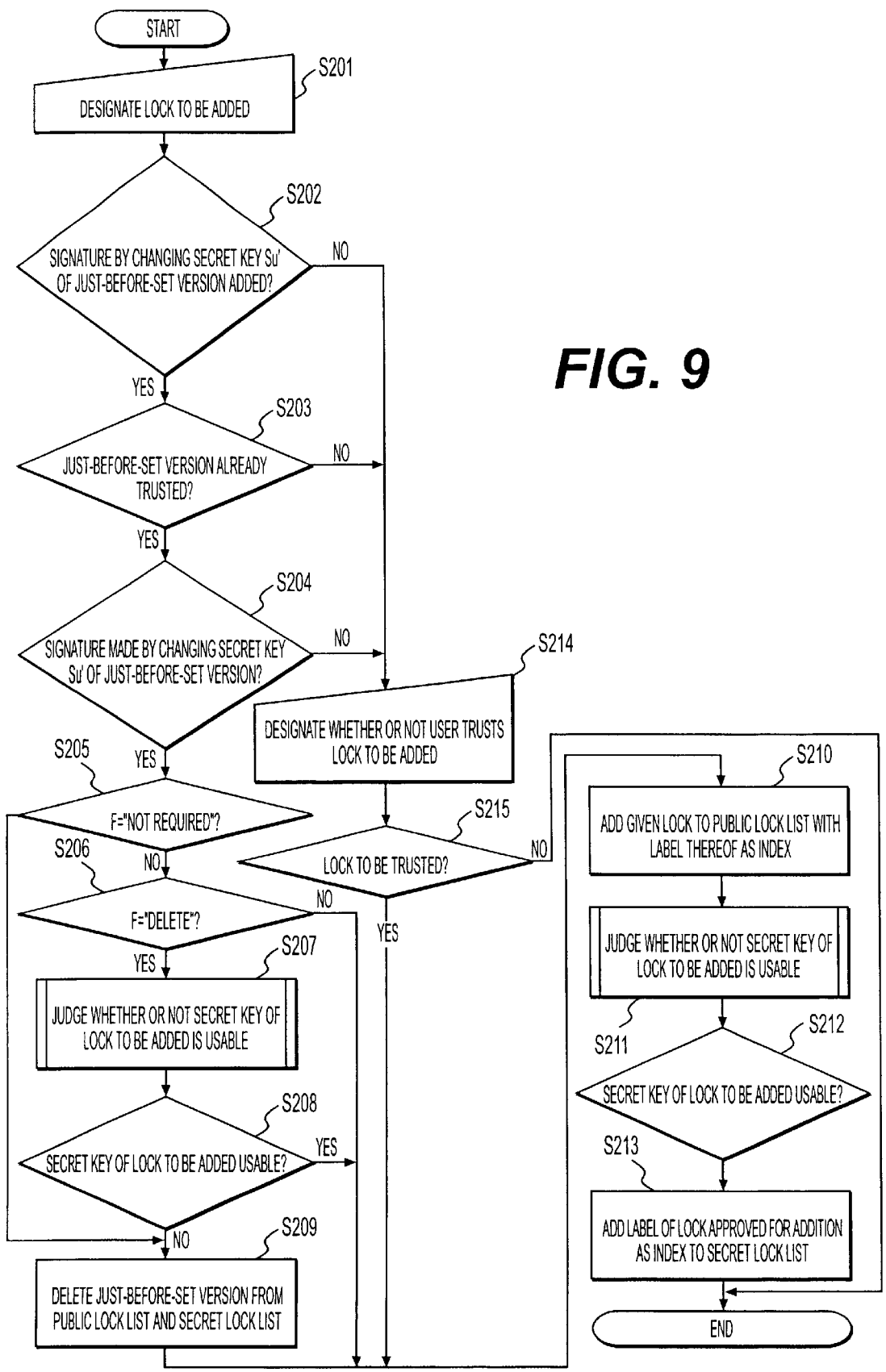
FIG. 9 is a flow chart for describing an adding flow operation to a lock list according to the present invention.

FIG. 9 is a flow chart for describing an adding process operation to a lock list. Only either a group lock or an individual public key, which can be trusted, is added into a lock list. This adding process operation may be utilized when a group lock produced by an individual himself and a group lock changed by the individual (new version is produced), and/or when a group lock obtained from another person is added.

In this embodiment, this adding process operation does not involve such a distribution process operation that a key is distributed by a notarial office, and a key is distributed by way of an electronic mail, or a floppy disk. Also, the following process operation is omitted. That is, while utilizing a signature with respect to a key, a calculation is made of a trust degree with respect to this signer, and of a trust degree with respect to a key of the signer. Then, the trust degree of this key is calculated. Alternatively, the above-described acquisition of the trust degree level calculated by this trust degree may be involved in this flow chart, which may be used to judge the trust degree. In this embodiment, the automatic trust process operation for a new version of the previously trusted group lock is represented. In this case, the new version is automatically trusted only when such a confirmation is made that this new version is signed by the changing secret key for the just-before-set version.

Only such a trusted group lock among the trusted group locks is added into the secret lock list, the secret key of which can be directly, or indirectly acquired by using the own personal secret key.

The contents of the flow operation shown in FIG. 9 will now be described in detail. When a lock to be added is designated at step 201, the following judgements are carried out at steps 202, 203, and 204. That is, a check is made as to whether or not a signature is made by the changing secret key $S_{U'}$ of the lock of the just-before-set version, a check is made as to whether or not trust exists, and another check is made as to whether or not a correctness of a signal is established. When any one of the check results is "NO", the process operation is advanced to step 214. At step 214, a judgement is made as to whether or not the adding lock is trusted by the owner of the credit key. When this adding lock is trusted, the process operation is advanced to step 210. Conversely, when this adding lock is not trusted, no adding operation into the lock list is carried out. At step 214 and another step 215, the above-described calculation for acquiring the trust degree may be employed.

Steps 205 to 209 correspond to steps for determining handling of the previous version. When a group key of a new version is added, the group lock of the previous version must be properly handled. This may be judged based upon the value of "F" contained in the group key of this new version. Since the previous version is old irrespective to the value of F, neither the encryption operation, nor the signing operation is carried out. To this end, both the public lock lists and the secret lock lists must be classified into the latest lock lists and the lock lists other than the latest lock. In this embodiment, this classification is omitted. However, when one list is utilized, this list is recognized as the latest list. The various process operations corresponding to the value of F are given as follows:

a) In the case that F="required", the group lock of the old version is left.

b) In the case that F="not required", the group lock of the old version is deleted.

c) In the case that F="delete", if an owner can acquire the secret key of the new version, then this acquired secret key is left. Otherwise, this acquired secret key is deleted.

Steps 210 to 213 correspond to such steps that the lock is added to the public lock list, and a judgement is made as to whether or not the secret key of the lock to be added can be utilized. When this secret key can be utilized, this secret key is further added to the secret lock list.

Feastable Judgement of Secret Lock

Figure 10:
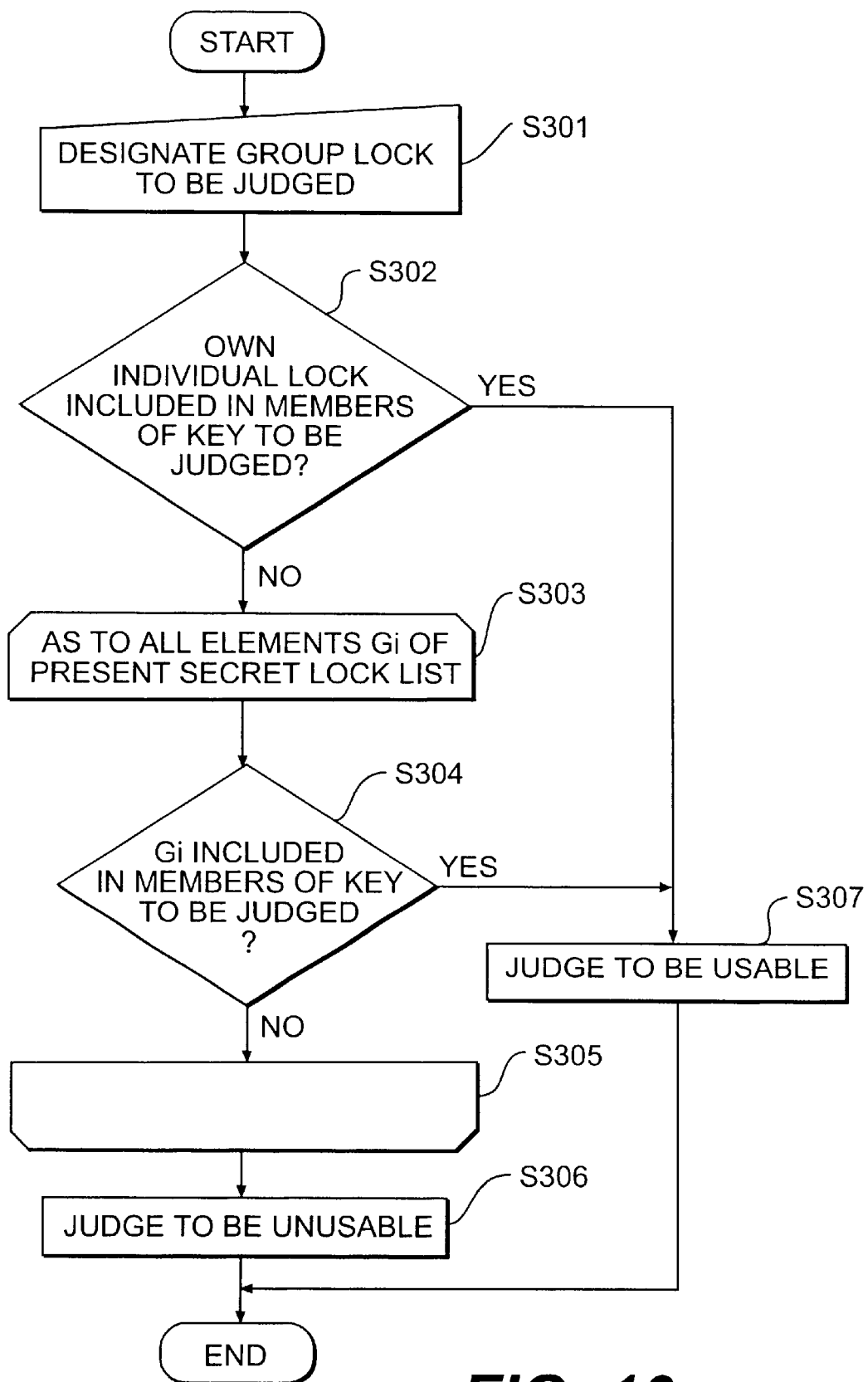
FIG. 10 is a flow chart for describing a flow operation to judge use probability of a secret lock according to the present invention.

FIG. 10 is a flow chart of a process operation for judging a feasibleness, or a usable possibility of a secret key. This feasible judgement is carried out as follows. A secret key encrypted/contained in an arbitrarily designated group lock can be acquired by directly, or indirectly applying the own private secret key.

This judgement process operation is used to judge as to whether or not a certain group lock can be involved in the secret lock list (steps 212 and 213 of FIG. 9). Additionally, the same judgement as this process is required in such a judgement case as to whether or not a group key can be utilized during a decryption operation. However, the following simple process operation may be performed as to whether or not the group lock involved in the secret lock list is contained in the secret lock list, while using all of the group locks by which the secret key can be acquired by the owner. There is less possibility that this process must be directly utilized.

The content of this process operation is performed. First, a judgement is made as to whether or not such a secret key of a group lock can be acquired which at step 301, information D for keeping a secrecy is inputted. At step 302, a selection is made of more than one of the latest groups and the public keys Pi corresponding to the individuals, which can be decrypted. This selection is carried out by that such a member capable of decrypting encrypted data is selected.

At step 303, a common key K is produced, and then the information D is encrypted by way of the common key encryption system while using "K" as a key. As previously described in the column "CRYPTOGRAM", since the encryption process and the decryption process of the public key encryption are delayed, the hybrid system has been employed in which the plain text is heck is done as to whether or not the own personal key is equal to a member of the group lock to be judged. If this own personal key is the member, then this key can be used. Conversely, if this own personal key is not the member, then another check is done as to the element Gi of the present secret lock list is equal to the member of the key to be judged. At steps 303, 304, and 305, "i" of the element Gi is sequentially incremented, and is repeatedly executed. During this repeating step, when any one of the elements Gi is equal to the member of the key to be judged, it is so judged "feasible".

Encryption Operation

Figure 11:
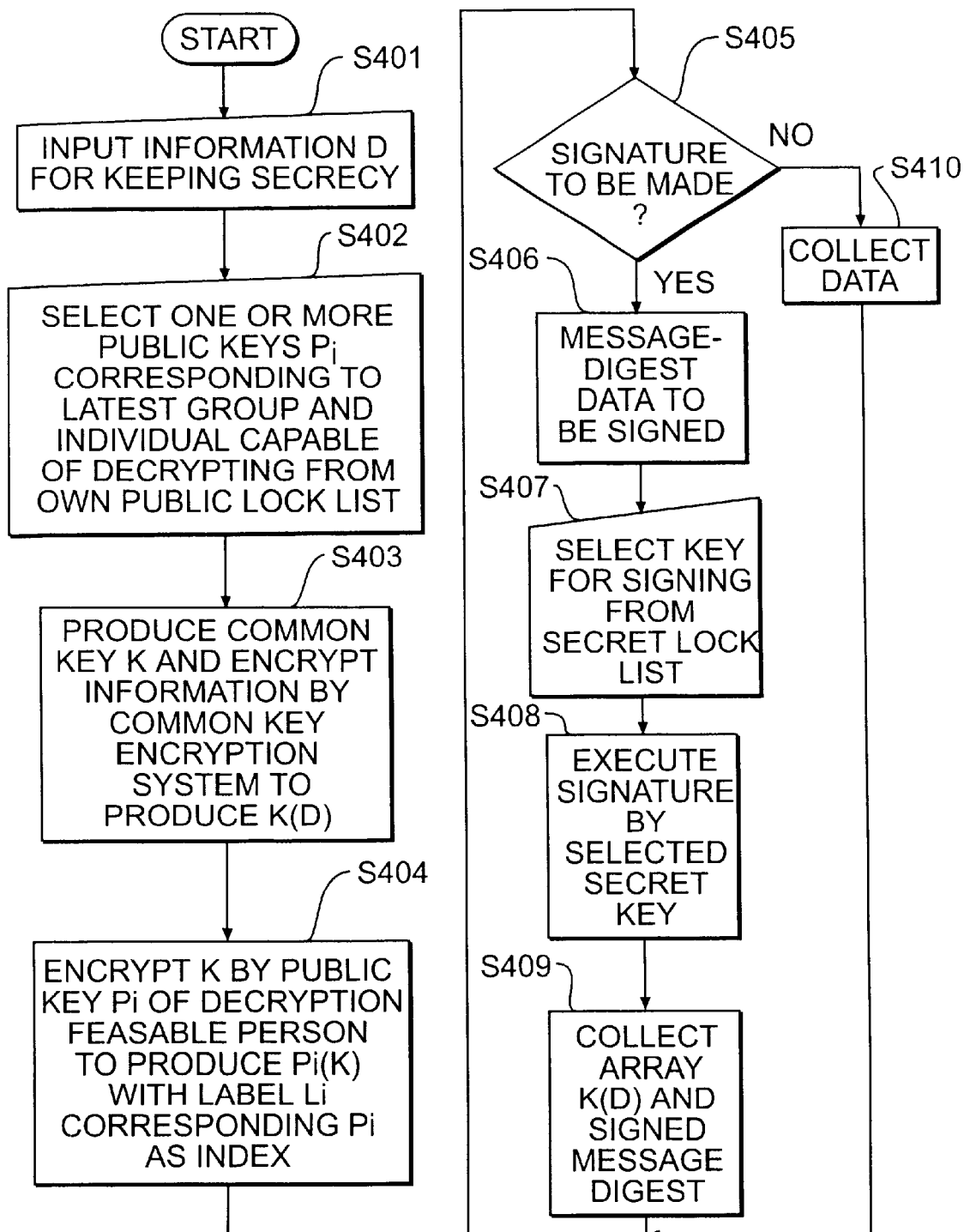
FIG. 11 is a flow chart for describing an encrypting process flow operation according to the present invention.

In FIG. 11, there is shown an encryption process flow operation of information. In this process operation, the below-mentioned three items should be entered:

a) Plain text.

b) Decryption feasible person.

More than one combination between the latest group locks, or the personal public keys contained in the public lock list is designated.

c) Signer.

Only one of the own personal secret keys, or the latest group locks contained in the secret lock list Is designated. If no signature is signed, then no designation is required.

Signing of a signature implies that the data to be signed is message-digested, and the signature block of this message digest is signed by using the secret key. The signature by way of the secret key is to encrypt with the secret key. A detailed description is referred to the above-described data structure "cbryptogram", and $Sig(S_U)$ of the data structure "group lock".

A detailed flow operation shown in FIG. 11 will now be described. At step 401, information D for keeping a secrecy is inputted. At step 402, a selection is made of more than one of the latest groups and the public keys Pi corresponding to the individuals, which can be decrypted. This selection is carried out by that such a member capable of decrypting encrypted data is selected.

At step 403, a common key X is produced, and then the information D is encrypted by way of the common key encryption system while using "K" as a key. As previously described in the column "CRYPTOGRAM", since the encryption process and the decryption process of the public key encryption are delayed, the hybrid system has been employed in which the plain text is encrypted by the common key encryption, and only this common key is encrypted by the public key encryption. It should be noted that this common key X may be produced every time the encryption process is performed, but also may be produced, if required, or a preselected number of common keys X may be produced.

At step 404, this common key "K" is encrypted by the public keys Pi of the respective decryption feasible persons to thereby produce Pi(K). Then, labels corresponding thereto are applied to Pi(K). At step 405, a check is made as to whether or not a signature is made as to this produced cryptogram. If no signature is made, then the respective data are collected at step 410, and then the encryption process operation is ended. Conversely, when the signature is made, the process operation is advanced to step 406.

Step 406 to 409 correspond to signature process steps. In the signature process steps, data to be signed is message-digested (step 406); a key for signing is selected from the secret lock list (step 407); a signature by the selected secret key is executed (step 408); and then both the array K(D) and the signed message digest (namely, signature block) are collected with each other (step 409). When the above-described steps are performed, the encryption process operation is accomplished.

Decryption Feasibility Judgement

Figure 12:
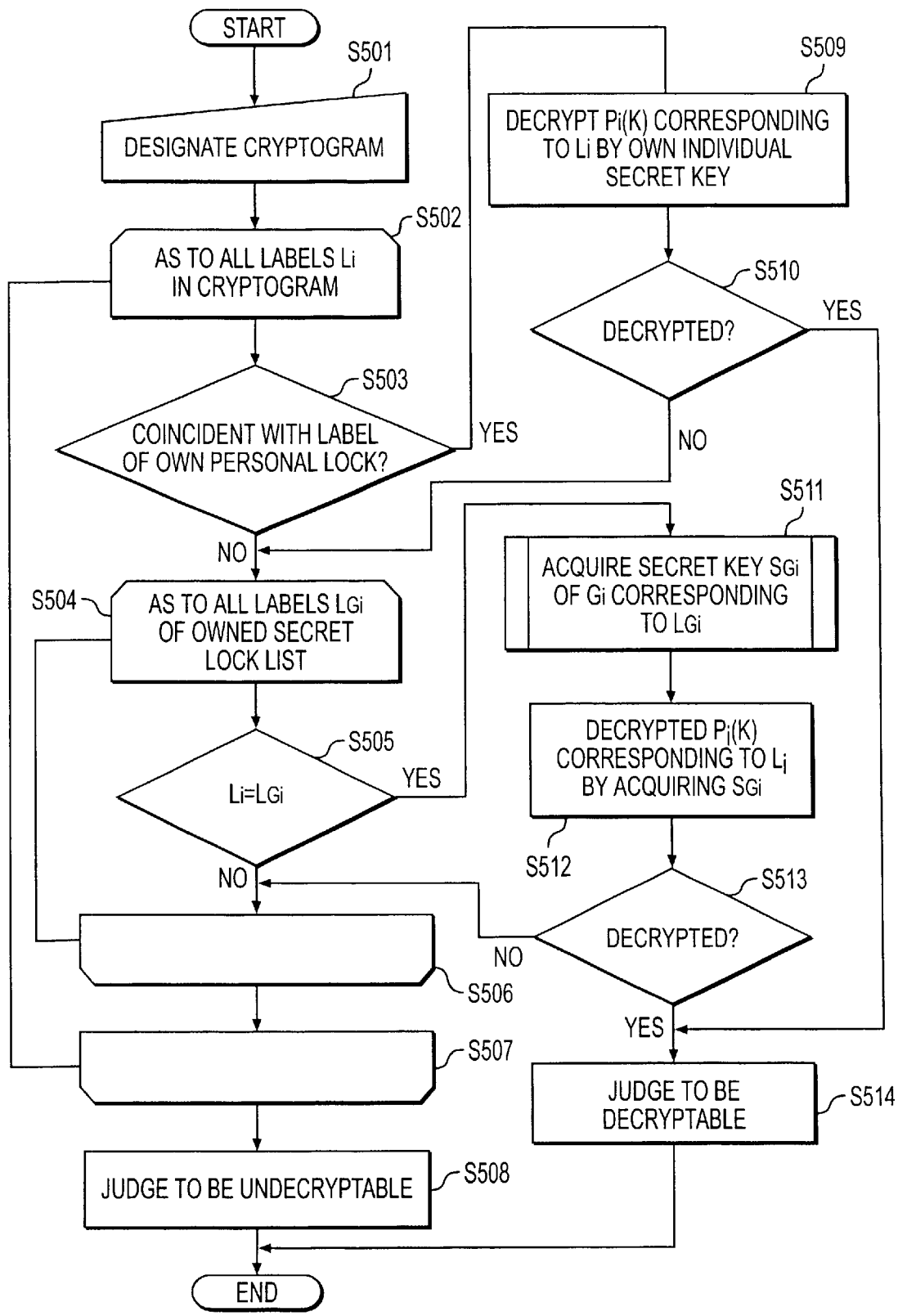
FIG. 12 is a flow chart for describing a flow operation to judge decryption probability according to the present invention.

FIG. 12 is a flow chart for describing a process operation for judging as to whether or not an arbitrary cryptogram can be decrypted. For instance, when a list of an encryption file is formed, this flow is used in order to confirm which cryptogram can be decrypted by an own file. This is a process flow operation capable of judging encryption feasibility in a high speed. Concretely speaking, while utilizing such a fact that when labels are not made coincident with each other, the cryptogram cannot be decrypted, a confirmation is firstly made of the coincident in the labels. Only when the labels are made coincident with each other, the cryptogram is decrypted. In general, once the label selecting method is properly decided, and then sufficient performance can be achieved by this method. If the label selecting method can be defined, then not only the label, but also the public lock used in the encryption process are applied to the "cryptogram", so that high-speed processing method may be realized.

In the process operation, the own personal secret key is first applied. If the cryptogram cannot be decrypted by this own personal secret key, then the respective group locks contained in the own secret lock list are applied. The decryption operation in this case is to decrypt only Pi(K) corresponding to the label Li contained in the "cryptogram". In this case, since the plain text is not desirably obtained, the decryption process of K(D) is not carried out.

Referring now to the flow chart, a detailed description will be made of the decryption feasibility judgement. At step 501, a cryptogram whose decryption feasibility is judged is designated. At steps 502 and 503, a judgement is made as to whether or not a label contained in the cryptogram is made coincident with the label of the own personal lock. When the labels are made coincident with each other, the process operation is advanced to step 509 at which the cryptogram is tried to be decrypted. In the case that the cryptogram cannot be decrypted, and also there is no coincident label at steps 502 and 503, another judgement is made as to whether or not this label is made coincident with the owned secret lock label at steps 504 and 505. When there is such a coincident label $L_{Gi}$, the process operation is advanced to step 511. At step 511, the secret key $S_{Gi}$ of Gi corresponding to the label $L_{Gi}$. Then, at steps 512 and 513, the decryption process is tried to be executed. In the case that the decryption process does not succeed, the process operation is advanced to steps 506 and 507 at which another check is made as to whether or not this label $L_{Gi}$ is made coincident with a label of another owned secret list, and a further check is done as to whether or not this label $L_{Gi}$ is made coincident with the label of the individual lock. It should be understood that step 506 indicates such a process operation that the same process operation at step 504 is repeatedly performed as to the different label, and step 507 represents such a process operation that the same process operation at step 502 is repeatedly performed as to the different label. When the cryptogram can be decrypted at step 510 or 513, it is so judged that the cryptogram can be decrypted at step 514.

Acquisition of Secret Key in Group Lock

Figure 13:
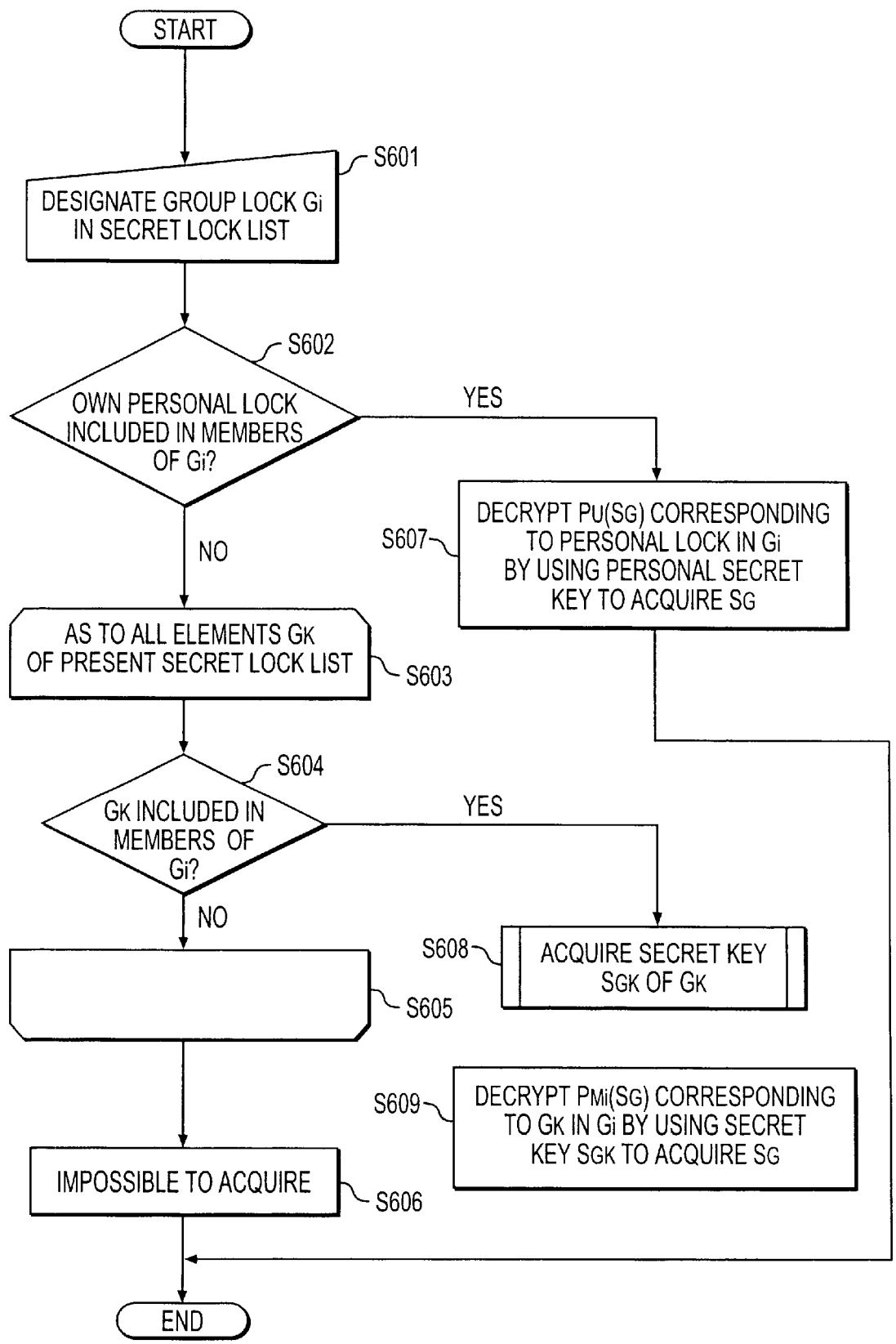
FIG. 13 is a flow chart for describing a flow operation to capture a secret key contained in the secret lock list according to the present invention.

FIG. 13 is a flow chart for describing a process operation for acquiring a secret key $S_G$ of a group lock existed in a secret lock list. A secret key of a group lock is used to decrypt cryptogram information, and to sign.

Since the secret lock list contains only the group locks capable of acquiring personal secret keys by directly, or indirectly applying the personal secret keys, these secret keys can be apparently acquired.

In this process operation, first of all, the own personal secret key is directly applied. If this direct application fails, then the group lock contained in the secret lock list is applied. When the group lock is tried to be applied, this process operation is recalled in the recursive manner. An oriented graph owns no loop, which is formed in such a manner that a group is a node, and an involving relationship among groups called members is formed as an oriented arc. As a consequence, the secret key can be acquired by this process operation.

A detailed description will now be made of the acquisition flow operation of the secret key $S_{Gi}$ shown in FIG. 13. At first step 601, a group lock Gi contained in the secret lock list is designated. At step 602, a check is done as to whether or not the own personal lock is contained in the member of the group lock Gi. If this own personal lock is contained in this members then the process operation is advanced to step 607. At step 607, $PMj(S_G)$ is extracted which is produced by encrypting the group secret key by the personal public key contained in the group lock Gi, and then this $PMj(S_G)$ is decrypted by the personal secret key so as to acquire the group secret key So.

Conversely, when the own personal lock is not contained in the member of the group Gi at step 602, a check is made as to whether or not Gk is equal to the member of Gi with respect to all of the elements Gk contained in the secret lock list at steps 603 to 605. These steps are such steps for checking as to whether or not each of "group locks Gk capable of using secret locks" owned by the owner is involved as the member of the group lock Gi. At step 604, when Gk equal to the member of the group lock Gi is detected, the secret key $S_{Gk}$ of Gk is acquired at step 608. At step 609, the encrypted $PMj(S_G)$ contained in the group lock Gi is extracted and then this is decrypted by the secret key $S_{Gk}$ to thereby acquire the group secret key $S_G$.

Decryption Process

Figure 14:
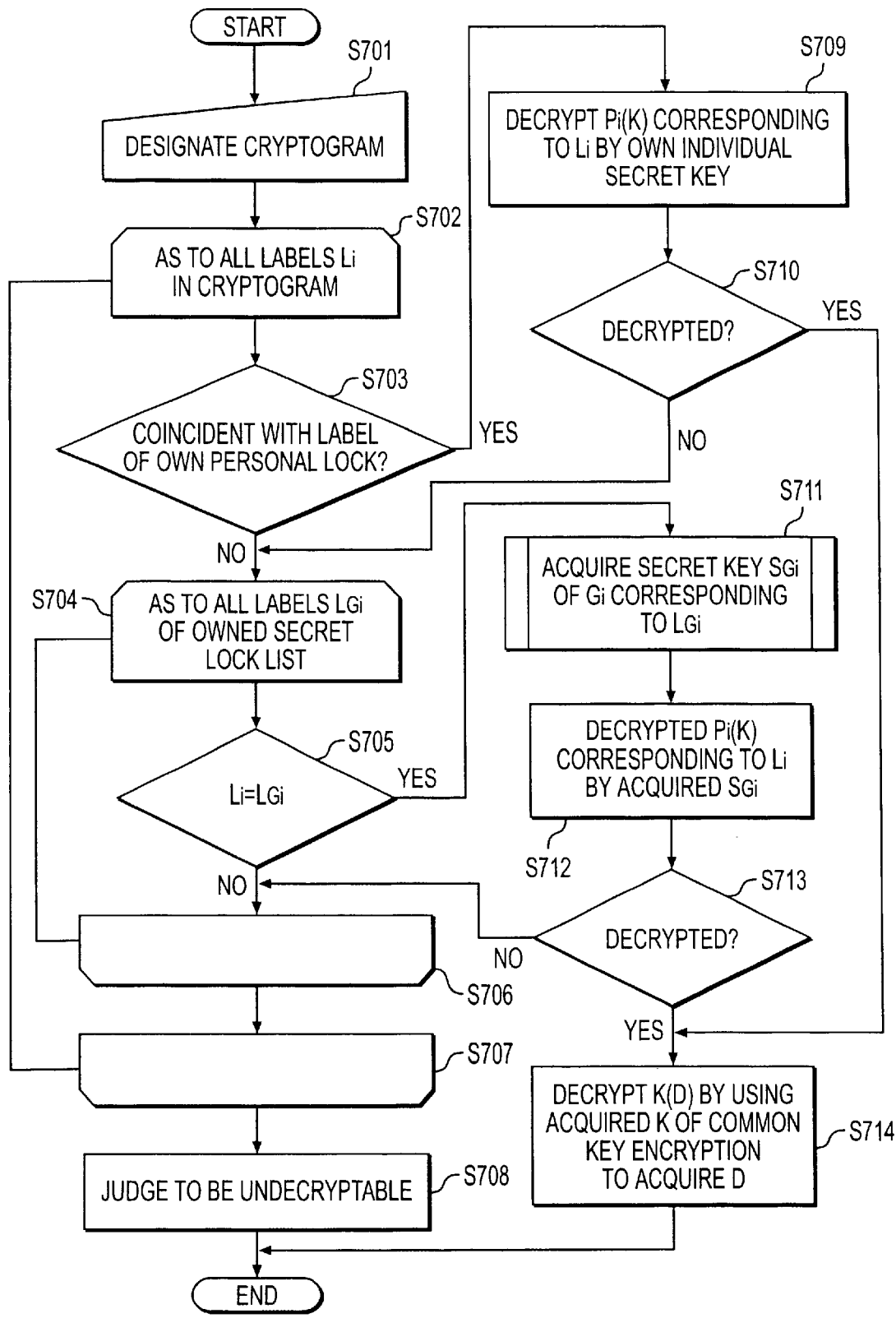
FIG. 14 is a flow chart for describing a decrypting process flow operation according to the present invention.

FIG. 14 is a flow chart for describing a flow operation executed when an arbitrary cryptogram is decrypted. It should be understood that a flow operation of FIG. 14 is substantially equal to that of the above-described "decryption feasibility judging" process operation. Steps 701 to 713 correspond to steps 501 to 513 defined in the decryption feasibility judging process operation of FIG. 12. It should be noted that at step 714, K(D) is decrypted by using a key "K" of a common key encryption to thereby acquire a plain text D. When the cryptogram is signed, if necessary, the plain text D is acquired and then the signature is confirmed.

Signature Confirmation

Figure 15:
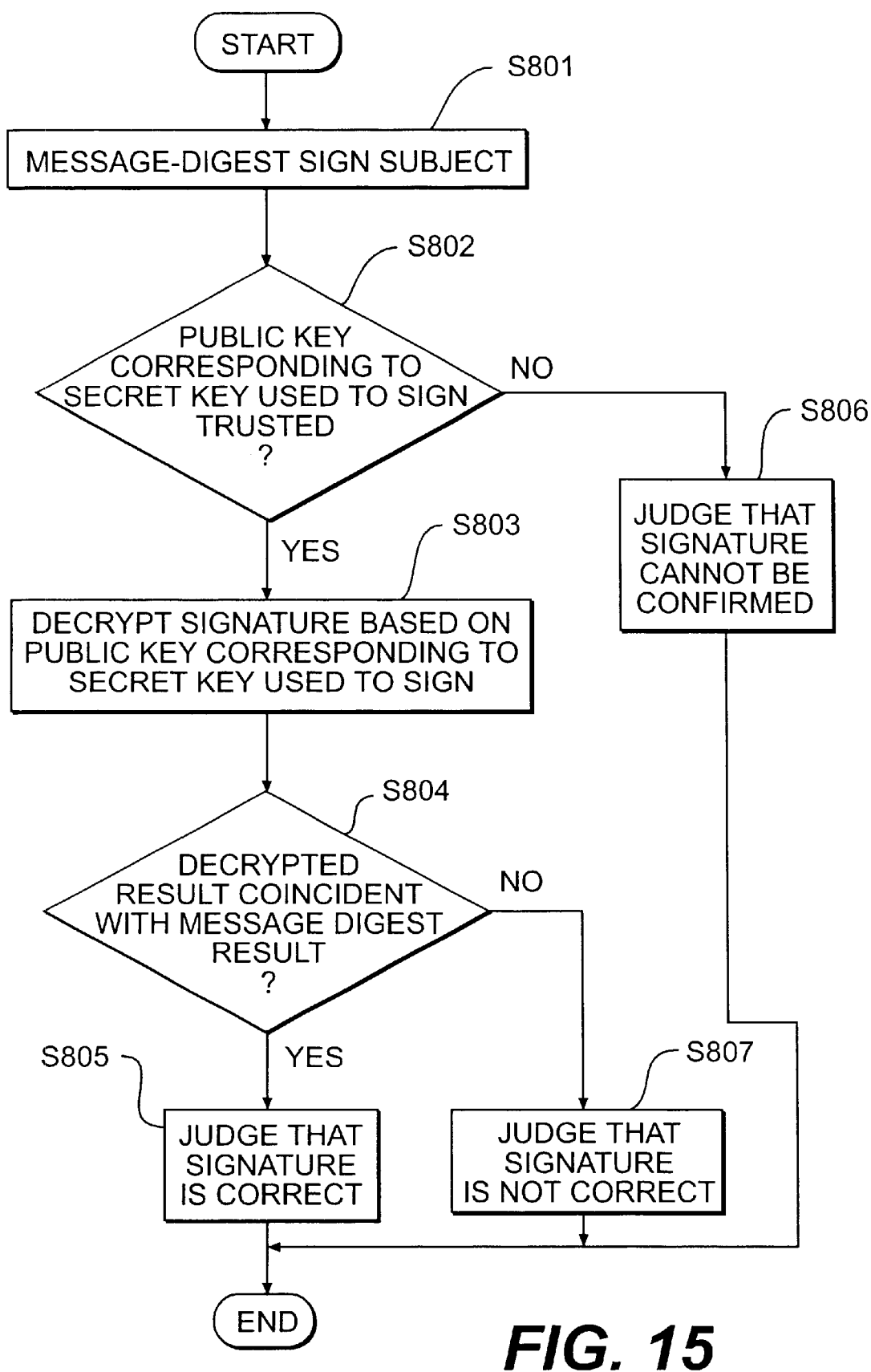
FIG. 15 is a flow chart for describing a signature confirming process flow operation according to the present invention.

FIG. 15 is a flow chart for describing a signature confirming operation. A result of executing the message digest process to the signature subject is compared with another result obtained by decrypting a signature block (namely, data applied by signature process) by using a public key corresponding to a secret key used when the signature is made. If these two results are equal to each other, then the signature can be correctly made, and it is possible to confirm that the signature subject is not forged.

It should be noted in this case that the public key corresponding to the secret key used in the signature must be trusted. This public key is merely contained in the own public lock list. Unless this public key is trusted, the signature cannot be confirmed.

Conversely, when the result of the message digest is not equal to the decrypted result, it can be seen that the signature subject is forged.

A detailed description will now be made of the sign confirmation process operation described in the flow chart of FIG. 15. At first step 801, a sign subject is message-digested. As previously described, this message digest is such a process operation that if the overall range of the sign subject is encrypted, then the high cost is required, and therefore, the information having approximately 128 bits is produced, depending upon the content of the sign subject range, irrespective of the data size of this sign subject range. At step 802, a judgement is made as to whether or not a public key corresponding to a secret key used to sign is trusted. In the case that this public key is not trusted, it is so judged at step 806 that the sign cannot be confirmed.

Conversely, when the credit of this public key can be confirmed at step 802, the process operation is advanced to step 803. At step 803, the encrypted signature is decrypted based upon the public key corresponding to such a secret key used while the signature block is signed. Then, the process operation is advanced to step 804. As a result, a check is made as to whether or not this decrypted result is made coincident with the message digest result. In an actual case, this step constitutes the signature confirmation step. If it is so judged at step 804 that this decrypted result is not made coincident with the message digest result, then this signature is not correct at step 807. In other words, it is so judged that the secret key used to sign is not correct. Conversely, when it is so judged that the message digest result is made coincident with the decrypted result, it can be concluded at step 805 that this signature is signed by the authorized person.

Change of Group Lock

Figure 16:
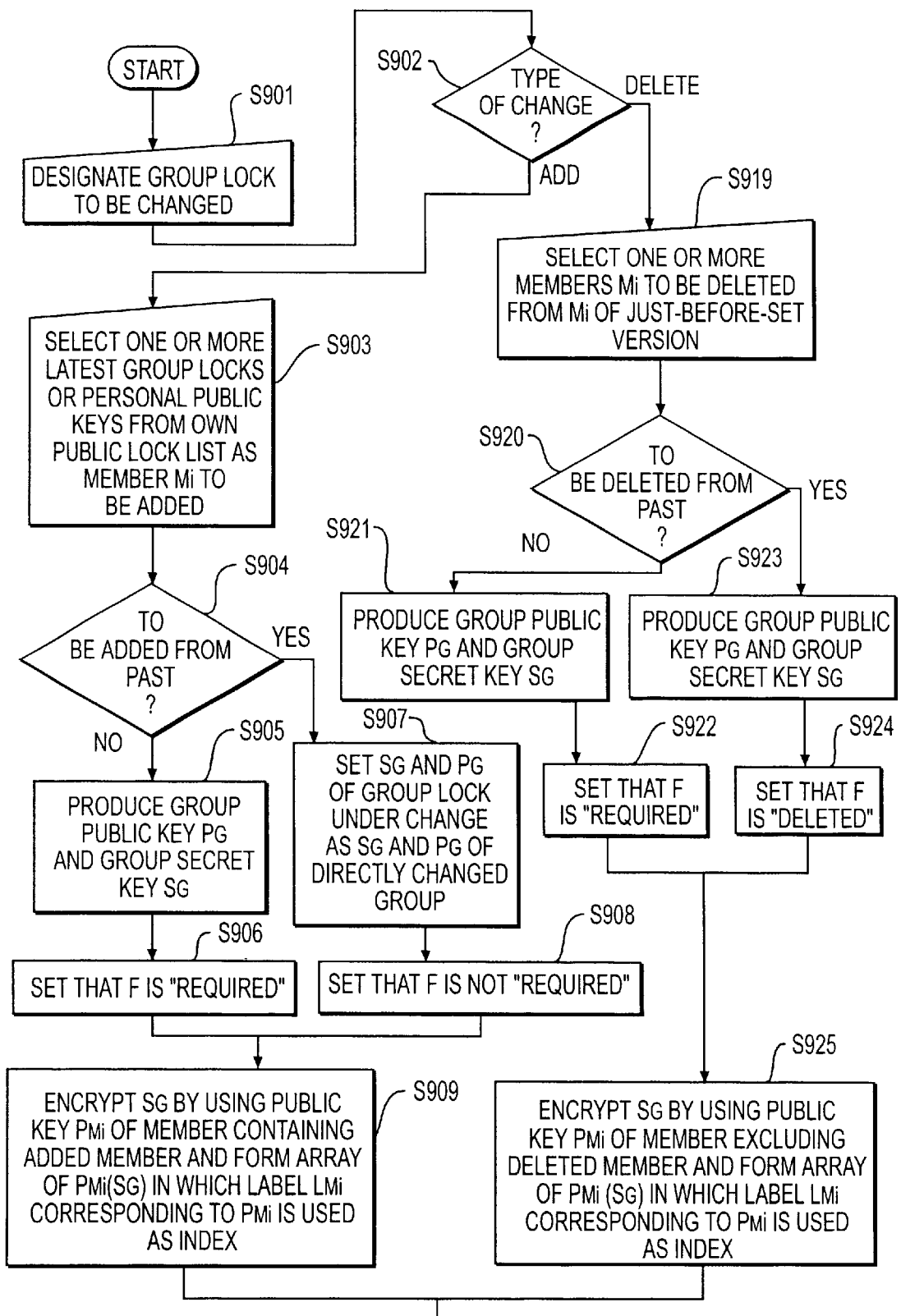
FIG. 16 is a flow chart for describing one group lock changing process flow operation according to the present invention.

FIG. 16 is a flow chart for describing a group lock changing process operation. There are 4 sorts of group lock changing processes. These 4 changing processes will now be described in a sequence from a left side of a branched portion in this flow chart.

A) Adding of new member from now.

A member is newly added. The newly added member cannot decrypt such a cryptogram which has been encrypted before this newly added member is made. In this case, it is assured that a pain of a new secret Key and a new public key is set to Se and $P_G$ of a group lock of a new version. Also, a value of "F" becomes "required". As a consequence, an individual who receives the new version does not delete the preceding version. This is required, since the cryptogram which has been encrypted before the new member is added is decrypted by the preceding member.

B) Adding of new member from the past.

A member is newly added. The newly added member can decrypt such a cryptogram which has been encrypted before this newly added member is made. In this case, it is assured that $S_G$ and $P_G$ of the preceding version are directly used. As a result, a value of "F" becomes "not required". Thus, an individual who receives the new version deletes the preceding version. Also, when the cryptogram which has been encrypted before the new member is added is decrypted, the new version may be utilized.

C) Existing member is deleted from now.

The existing member is deleted. The deleted member can decrypt a cryptogram which has been encrypted before the existing member was deleted. Apparently, the deleted member cannot decrypt a cryptogram which has been encrypted after the existing member is deleted. In this case, a pair of a now secret key and a new public key is set to $S_G$ and $P_G$ of a group lock of a new version. Also, a value of "F" becomes "required". As a consequence, an individual who receives the new version does not delete the preceding version. This is required, since the cryptogram which has been encrypted before the existing member is deleted is decrypted by the preceding members including the deleted member.

D) Existing member is deleted from the past.

The existing member is deleted. The deleted member cannot decrypt a cryptogram which has been encrypted before the existing member was deleted. In this case, a pair of a new secret key and a new public key is set to $S_G$ and $P_G$ of a group lock of a new version. Also, a value of "F" becomes "delete". As a consequence, an individual who receives the new version does not delete the preceding version. This is required, since the cryptogram which has been encrypted before the exiting member is deleted is decrypted by the preceding members including the deleted member. It should be understood that if the received individual cannot acquire the secret key of the new version, namely this received individual is the deleted member, then this encrypted cryptogram is deleted. This is because the deleted member cannot decrypt the cryptogram which has been encrypted before the existing member is deleted. Such an idea that this deleted member deletes the group lock of the preceding version does not mathematically guarantee, but emphasizes that the group lock of the preceding version is deleted as the system.

When the group lock is changed, not only the value of "F" owns the meaning, but also the signature is signed by using the changing secret key of the preceding version. As previously described, this is because when the preceding version is trusted, the new version can be automatically trusted. When the group lock is changed, the changed group lock is quickly distributed to any persons who want to receive this changed group lock.

Figure 17:
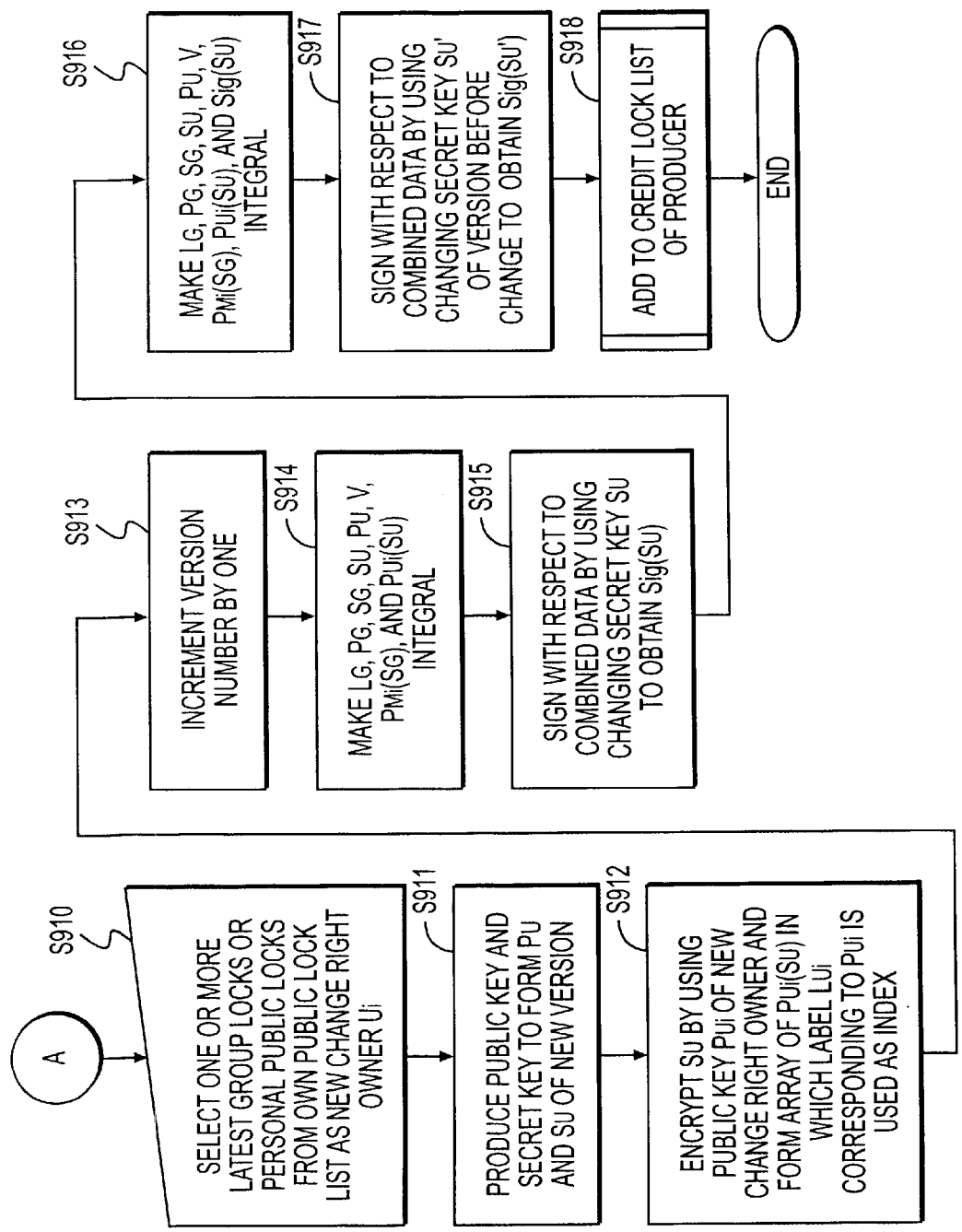
FIG. 17 is a flow chart for describing another group lock changing process flow operation according to the present invention.

Referring now to flow charts shown in FIGS. 16 and 17, the group lock changing process operation will be described in detail. At steps 901 and 902, a group lock to be changed is specified, and a changing sort is discriminated. At step 902, a selection is made of a deletion process operation and an addition process operation. However, when both the deletion process operation and the addition process operation are simultaneously carried out similar to the member replacement, an order is set to each of members, and these process operations are executed every 1 member.

When the member is added at step 902, the process operation is advanced to step 903 at which a public key of a group, or an individual corresponding to the member to be added is selected from a public lock list. Next, at step 904, a judgment is made as to whether this member is added from now, or from the past. That is to say, a decision is made as to whether or not the past cryptogram information can be decrypted. If the judgment result at step 904 is "NO", namely the member is added from now, then both the group public key $P_G$ and the group secret key $S_G$ are produced at step 905. At step 906, it is so set that "F" is required which indicates handling of the just-before-set version of the group lock. This implies that the group lock of the new version and the group lock of the original old version are jointly present. On the other hand, if the judgement result at step 904 is "member is added from the past", then the process operation to steps 907 and 908. At these steps, $S_G$ and $P_G$ of the group lock under change are set as $S_G$ and $P_G$ of the directly changed group, and also the value of F is set to "not required". This indicates that the group lock of the old version can be completely replaced by the group lock of the new version. At step 909, the group secret key $S_G$ is encrypted by using the public key $P_{Mi}$ of the member containing the added member, and such an array of $P_{Mi}(S_G)$ is formed in which the label $L_{Mi}$ corresponding to $P_{Mi}$ is used as the index.

At step 910, a new change right owner is set. At step 911, a pair of a secret key and a public key of the changed key is produced. At step 912, the secret key of the change key is encrypted by using the public key of the new change right owner.

Furthermore, at step 913, the version number V is updated. At step 914, the respective data are combined with each. At step 915, a signature is signed by employing a changed secret key with respect to the combined data to thereby obtain a signature result $Sig(S_U)$. At step 916, the data are further combined with the signature result. At step 917, a signature is signed by using a changing secret key $S_{U'}$ of the version before changed to thereby obtain $Sig(S_{U'})$. At step 918, the changed group lock is added to the credit lock list of the producer, and then the group lock changing process operation is accomplished.

When the member is deleted at step 902, the process operation is advanced to step 913 at which a member to be deleted is selected. Next, at step 920, a judgment is made as to whether this member is deleted from now, or from the past. That is to say, a decision is made as to whether or not the past cryptogram information can be decrypted. If the judgment result at step 920 is "NO", namely the member is deleted from now, then both the group public key $P_G$ and the group secret key $S_G$ are produced at step 921. At step 922, it is so set that "F" is required which indicates handling of the just-before-set version of the group lock. This implies that the group lock of the new version and the group lock of the original old version are jointly present. On the other hand, if the judgement result at step 920 is "member is deleted from the past", then the process operation to steps 923 and 924. At these steps, $S_G$ and $P_G$ of the group lock under change are set as $S_G$ and $P_G$ of the directly changed group, and also the value of F is set to "deleted". At step 925, the group secret key $S_G$ is encrypted by using the public key $P_{Mi}$ of the member from which the above-deleted member has been deleted, and an array of $P_{Mi}(S_G)$ is formed in which the label $L_{Mi}$ corresponding to $P_{Mi}$ is used as an index. Process operations defined after step 910 are similar to these of the member adding operation.

As previously described in detail, according to this embodiment, for instance, the production or the changing operation of the composite lock may be executed in any of the encryption apparatus, the decryption apparatus, and another apparatus of a third party. This may be similarly applied to other structural elements used in this public key encryption system.

While the present invention has been described in detail, in accordance with the group type public key encryption system of the present invention, the idea of "group" is introduced in the conventional public key encryption system where the individual is used as a unit. Then, both the encryption process operation of the plain text by an arbitrary member belonging to this group, and the decryption process of the cryptogram information can be executed by employing such a combination key made from the group public key and the group secret key, which are produced in unit of "group", and further the individual public key and the individual secret key. With employment of this encryption system, while high secrecies can be maintained inside and outside the group, the cryptogram information can be commonly shared based upon the confirmation of the member among the members within this group. Also, since the electronic signature is made by the member belonging to the group.

Furthermore, in the group type public key encryption system according to the present invention, when the group lock with respect to the change of the member for constituting the group is changed, a pair of a group public key and a group secret key is newly produced and registered, which is done when the member is changed. As a result, the group lock for the member change can be flexibly changed. Also, the signature used when the group lock is changed is signed with respect to the overall array of the elements for constituting the group lock, so that the changing operation can be firmly guaranteed.

What is claimed is:

1. In a computer readable recording medium for recording an encryption method used in a public key encryption system comprising a combination between a first key P and a second key S, said first key P being used in a data conversion for encrypting a plain text, and said second key S being different from said first key P and being used in a data conversion for decrypting a cryptogram to produce a plain text, said recording medium records a program for:

generating a group comprising one or more members Mi (i=1 to n);

generating a group public key $P_G$ and a group secret key $S_G$, which are allocated to the group; and encrypting one or more encryptions of a group secret key $P_{Mi}$ ($S_G$) (i=1 to n) encrypted by executing the data conversion of said group secret key $S_G$ by each of public keys $P_{Mi}$ specific to said members Mi, wherein said members Mi are each capable of encrypting one or more encryptions of said group secret key, wherein said encrypted group secret keys $P_{Mi}$ ($S_G$) are decrypted by a member secret key $S_{Mi}$ specific to each of said members Mi to thereby acquire said group secret key $S_G$ and said acquired group secret key $S_G$ is used to execute a decryption process operation of cryptogram information encrypted by any of said members Mi using said group public key $P_G$.

2. The computer readable recording medium as claimed in claim 1, wherein said encrypted cryptogram information is a decryption key S1 of another cryptogram information, and said encrypted group secret keys $P_{Mi}$ ($S_G$) are decrypted by the member secret key $S_{Mi}$ specific to each of said members Mi to thereby acquire said group secret key $S_G$, $P_G$ (S1) equal to said decryption key S1 which is encrypted by said group public key $P_G$ is decrypted by said group secret key $S_G$ to thereby acquire said decryption key S1, and said another cryptogram information is decrypted by said acquired decryption key S1.

3. The computer readable recording medium as claimed in claim 1, wherein each of said members Mi is a discriminator capable of discriminating an individual, a group formed by a plurality of individuals, an execution function of a preset role, and an execution system of a preset role.

4. The computer readable recording medium as claimed in claim 1, wherein a combination between said group public key $P_G$ and said encrypted group secret key $P_{Mi}$ ($S_G$) (i=1 to n), which are produced in unit of said group, is arranged by a composite lock.

5. The computer readable recording medium as claimed in claim 4, wherein said composite lock includes a composite lock changing public key $P_U$ belonging to an authorized changing right owner of the composite lock; and one or more encrypted composite lock changing secret keys $P_{Ui}$ ($S_U$) which are produced, while executing a data conversion by the public key $P_{Ui}$ specific to a member who owns a right for changing said composite lock, by encrypting a composite lock changing secret key $S_U$ which constitutes a pair with said composite lock changing public key $P_U$.

6. The computer readable recording medium as claimed in claim 4, wherein a pair of said group public key $P_G$ and said group secret key $S_G$ in said composite lock is changed in response to a change in the structure of said composite lock.

7. The computer readable recording medium as claimed in claim 5, wherein both said composite lock changing public key $P_U$ and said composite lock changing secret key $S_U$ are replaced by a pair of a new composite lock changing public key $P_U$ and a new composite lock changing secret key $S_U$ by changing said composite lock changing right owner.

8. The computer readable recording medium as claimed in claim 5 or 6, wherein said composite lock owns an electronic signature block in which an electronic signature is executed by said composite lock changing secret key $S_U$ with respect to data for constituting said composite lock.

9. The computer readable recording medium as claimed in claim 8, wherein the electronic signature block obtained as a result of an electronic signature by using said composite lock changing secret key $S_U$ with respect to the data for constituting the changed composite lock is newly added to the data for constituting said changed composite lock, data involving said signature block and said changed composite lock is set as a new composite lock, and said new composite lock further comprises a second signature block signed to said new composite block by employing changing secret key $S_U$.

10. The computer readable recording medium as claimed in claim 4, wherein said composite lock owns a version discriminator V indicative of a version of said composite lock, and said version discriminator V indicates as to whether or not said composite lock is equal to the latest version.

11. The computer readable recording medium as claimed in claim 4, wherein said composite lock owns a preceding version handling discriminator F, and said preceding version handling discriminator F is to define handling of a just-before-set version of said composite lock.

12. The computer readable recording medium as claimed in claim 11, wherein said preceding version handling discriminator F is produced based upon a changed content of said composite lock.

13. The computer readable recording Medium as claimed in claim 11, wherein said preceding version handling discriminator F contains information for discriminating as to whether or not said composite lock has been changed.

14. In a computer readable recording medium for recording an encryption method used in a public key encryption system wherein structural data is arranged as cryptogram information, and said structural data contains cryptogram information K(D) produced by encrypting at least a plain text by a common key K, and also one or more Pi(K) produced by encrypting said common key K by a public key Pi of each member belonging to a group in which one or more members Mi (i=1 to n) are set as structural members and are each capable of encrypting one or more Pi(K).

15. A computer based method of using a public key encryption system comprising a combination between a first key P and a second key S, said first key P being used in a data conversion for encrypting a plain text, and said second key S being different from said first key P and being used in a data conversion for decrypting a cryptogram to produce a plain text, comprising:
- a step for generating a group comprising one or more members Mi (i=1 to n);
- a step for executing a data conversion of a plain text by using a group public key $P_G$ so as to encrypt said plain text, said group public key $P_G$ being allocated to the group;
- a step for producing one or more encryptions of a group secret key $P_{Mi}(S_G)$ (i=1 to n) in such a manner that a group secret key $S_G$ produced by a public key $P_{Mi}$ of said members Mi, wherein said members Mi are each capable of encrypting one or more encryptions of said group secret key, in unit of said group; and
- a step wherein said encrypted group secret keys $P_{Mi}(S_G)$ are decrypted by a member secret key $S_{Mi}$ specific to each of said members Mi to thereby acquire said group secret key $S_G$ and execute a decryption process operation on plain text encrypted by any of said members Mi using said group public key $P_G$.

16. A computer based method of using a public key encryption system comprising a combination between a first key P and a second key S, said first key P being used in a data conversion for encrypting a plain text, and said second key S being different from said first key P and being used in a data conversion for decrypting a cryptogram to produce a plain text, comprising:
- a step for generating a group comprising one or more members Mi (i=1 to n);
- a step for decrypting an encrypted group secret key $P_{Mi}(S_G)$ based upon a secret key $S_{Mi}$ of one or more members Mi (i=1 to n), said encrypted group secret key being produced by each of said one or more members being capable of encrypting based on a public key $P_{Mi}$ of said one or more members of group secret key $S_G$ which is allocated to the group; and
- a step for decrypting encrypted information in such a manner that information encrypted by a group public key $P_G$, executed by any of said one or more members, produced in unit of said group is data-converted by employing said acquired group secret key $S_G$.

17. In a computer based method of using public key encryption system comprising a combination between a first key P and a second key S, said first key P being used in a data conversion for encrypting a plain text, and said second key S being different from said first key P and being used in a data conversion for decrypting a cryptogram to produce a plain text, a composite lock producing method in said public key encryption system for using a composite lock including a group public key $P_G$ and a group secret key $S_G$ which are allocated to a group constituted by one or more members Mi (i=1 to n) as constructive members, and one or more encryptions of a group secret keys $P_{Mi}(S_G)$ (i=1 to n) which are encrypted by executing a data conversion of said group secret key $S_G$ based upon each of public keys $P_{Mi}$ specific to said members Mi, comprising:
- a step for producing a public key $P_G$ and a secret key $S_G$ in unit of a group constituted by one or more members Mi (i=1 to n) as constructive members;
- a step for producing one or more encryptions of a group secret key $P_{Mi}(S_G)$ (i=1 to n) which are encrypted by each of said one or more members being capable of executing a data conversion of said group secret key $S_G$ based upon each of public keys $P_{Mi}$ specific to said members;
- a step wherein said encrypted group secret keys $P_{Mi}(S_G)$ are decrypted by a member secret key $S_{Mi}$ specific to each of said one or more members Mi to thereby acquire said group secret key $S_G$ and execute a decryption process operation on plain text encrypted by any of said one or more members Mi using said group public key $P_G$;
- a step for producing one or more encrypted composite lock changing secret keys $P_{Ui}(S_U)$ which are encrypted by data-converting a composite lock changing secret key $S_U$ for controlling a change of a composite lock based upon a public key $P_{Ui}$ specific to a member having a right to execute a change; and
- a step for performing an electronic signature by using said produced composite lock changing secret key $S_U$ with respect to data containing said produced public key $P_G$, said encrypted secret key $P_{Mi}(S_G)$, and said encrypted composite lock changing secret key $P_{Ui}(S_U)$.

18. A computer based composite lock changing method for an encryption system wherein in a public key encryption system arranged by a combination between a first key P and a second key S, said first key P being used in a data conversion for encrypting a plain text, and said second key S being different from said first key P and being used in a data conversion for decrypting a cryptogram to produce a plain text, said public key encryption system uses a composite lock including a group public key $P_G$ and a group secret key $S_G$ which are allocated to a group constituted by one or more members Mi (i=1 to n) as constructive members, one or more encryptions of a group secret key $P_{Mi}(S_G)$ (i=1 to n) which are encrypted by each of said one or more members being capable of executing a data conversion of said group secret key $S_G$ based upon each of public keys $P_{Mi}$ specific to said members Mi, and one or more encrypted composite lock changing secret keys $P_{Ui}(S_U)$ encrypted by executing a data conversion of a composite lock changing secret key $S_U$ for controlling a change of a composite lock based upon a public key $P_U$ specific to a member having a right to change, comprising:
- a step for changing a content of a composite lock;
- a step for obtaining a composite lock changing secret key $S_U$ by decrypting said encrypted composite lock changing secret key $P_{Ui}(S_U)$ by using a secret key $S_{Ui}$;
- a step for performing an electronic signature by using said produced composite lock changing secret key $S_U$ with respect to data containing said public key $P_G$, said encrypted group secret key $P_{Mi}(S_G)$, and said encrypted composite lock changing secret key $P_{Ui}(S_U)$; and
- a step wherein said encrypted group secret keys $P_{Mi}(S_G)$ are decrypted by a member secret key $S_{Mi}$ specific to each of said members Mi to thereby acquire said group secret key $S_G$ and execute a decryption process operation on plain text encrypted by any of said members Mi using said group public key $P_G$.

19. The computer based method as claimed in claim 18, further comprising a step for producing a pair of a replacement composite lock changing public key $P_U$ for controlling a change of a composite lock and a replacement composite lock changing secret key $S_U$, and a step for producing one or more replacement encrypted composite lock changing secret keys $P_{Ui}(S_U)$ to be applied to a composite lock, said one or more replacement encrypted composite lock changing secret keys being encrypted by executing a data conversion by a public key $P_{Ui}$ specific to a member having a right to change said composite lock.

20. The computer based method as claimed in claim 19, further comprising a step for newly applying a signature block to data for constructing said changed composite lock, for setting entire data containing said signature block as a new composite lock, and for signing said new composite lock by said changing secret key $S_U$, obtained before said composite lock is changed, said signature block being equal to a result of electronically signing the data for constituting the changed composite lock by said composite lock changing secret key $S_U$.

21. In a computer based method of using public key encryption system comprising a combination between a first key P and a second key S, said first key P being used in a data conversion for encrypting a plain text, and said second key S being different from said first key P and being used in a data conversion for decrypting a cryptogram to produce a plain text, a composite lock changing method in said public key encryption system for using a composite lock including a group public key $P_G$ and a group secret key $S_G$ which are allocated to a group constituted by one or more members Mi (i=1 to n) as constructive members, and one or more encryptions of a group secret key $P_{Mi}(S_G)$ (i=1 to n) which are encrypted by each of said one or more members being capable of executing a data conversion of said group secret key $S_G$ based upon each of public keys $P_{Mi}$ specific to said members Mi, and said encrypted group secret keys $P_{Mi}(S_G)$ are decrypted by a member secret key $S_{Mi}$ specific to each of said members Mi to thereby acquire said group secret key $S_G$ and execute a decryption process operation on plain text encrypted by any of said members Mi using said group public key $P_G$, wherein in the case that when a member is changed, a pair of a new group public key $P_G$ and a new group secret key $S_G$ is produced, and said new group public/secret keys are used as a new public key and a new secret key of said composite lock; and in the case that a member was changed in the past, a pair of the present group public key $P_G$ and the group secret key $S_G$ is continuously used without any modification as a public key and a secret key of said composite lock.

22. In a computer readable recording medium for recording an encryption method used in a public key encryption system comprising a combination between a first key P and a second key S, said first key P being used in a data conversion for encrypting a plain text, and said second key S being different from said first key P and being used in a data conversion for decrypting a cryptogram to produce a plain text, said recording medium records a program for executing:

a step for executing a data conversion of a plain text using a group public key $P_G$ so as to encrypt said plain text, said group public key $P_G$ being allocated to a group constituted by one or more members Mi (i=1 to n) as constructive members;

a step for producing one or more encryptions of a group secret key $P_{Mi}(S_G)$ (i=1 to n) in such a manner that each of said one or more members are capable of producing a group secret key $S_G$ encrypted by a public key $P_{Mi}$ of said group; and a step wherein said encrypted group secret keys $P_{Mi}(S_G)$ are decrypted by a member secret key $S_{Mi}$ specific to each of said members Mi to thereby acquire said group secret key $S_G$ and execute a decryption process operation on plain text encrypted by any of said members Mi using said group public key $P_G$.

23. In a computer readable recording medium for recording a decryption method used in a public key encryption system comprising a combination between a first key P and a second key S, said first key P being used in a data conversion for encrypting a plain text, and said second key S being different from said first key P and being used in a data conversion for decrypting a cryptogram to produce a plain text, said recording medium records a program for executing:

a step for decrypting an encrypted group secret key $P_{Mi}(S_G)$ based upon a secret key $S_{Mi}$ of one or more members Mi (i=1 to n), said encrypted group secret key being produced by each of said one or more members being capable of encrypting based on a public key $P_{Mi}$ of said one or more members a group secret key $S_G$ which is allocated to a group constituted by said one or more members as the constructive members; and a step for decrypting encrypted information in such a manner that information encrypted by a group public key $P_G$, executed by any of said one or more members, produced in unit of said group is data-converted by employing said acquired group secret key $S_G$.

\* \* \* \* \*

UNITED STATES PATENT AND TRADEMARK OFFICE
CERTIFICATE OF CORRECTION

PATENT NO. : 6,530,020 B1  
DATED : March 4, 2003  
INVENTOR(S) : Ryuichi Aoki

It is certified that error appears in the above-identified patent and that said Letters Patent is hereby corrected as shown below:

Title page,
Under the *Assistant Examiner*, insert -- [74] *Attorney, Agent, or Firm*— Finnegan, Henderson, Farabow, Garrett, & Dunner LLP --.

Column 28,
Line 62, "Medium" should read -- medium --.

Column 29,
Line 25, "m embers" should read -- members --.
Line 32, "an d" should read -- and --.
Line 67, "keys" should read -- key --.

Signed and Sealed this

Twenty-ninth Day of July, 2003

JAMES E. ROGAN
*Director of the United States Patent and Trademark Office*